(12) United States Patent
Daniel et al.

(10) Patent No.: US 9,012,781 B2
(45) Date of Patent: Apr. 21, 2015

(54) ELECTRICAL TRANSMISSION CABLES WITH COMPOSITE CORES

(75) Inventors: Allan Daniel, Woodland, AL (US); Paul Springer, Atlanta, GA (US); Yuhsin Hawig, Carrollton, GA (US); Mark Lancaster, Brooks, GA (US); David W. Eastep, Winona, MN (US); Sherri M. Nelson, Winona, MN (US); Tim Tibor, Winona, MN (US); Tim Regan, Winona, MN (US); Michael L. Wesley, Dover, MN (US)

(73) Assignee: Southwire Company, LLC, Carrollton, GA (US)

( * ) Notice: Subject to any disclaimer, the term of this patent is extended or adjusted under 35 U.S.C. 154(b) by 341 days.

(21) Appl. No.: 13/443,938

(22) Filed: Apr. 11, 2012

(65) Prior Publication Data

US 2012/0261158 A1    Oct. 18, 2012

Related U.S. Application Data

(60) Provisional application No. 61/474,423, filed on Apr. 12, 2011, provisional application No. 61/474,458, filed on Apr. 12, 2011.

(51) Int. Cl.

| | |
|---|---|
| H01B 9/00 | (2006.01) |
| H01B 9/04 | (2006.01) |
| H01B 1/02 | (2006.01) |
| B29C 70/52 | (2006.01) |
| H01B 5/10 | (2006.01) |
| H01R 43/00 | (2006.01) |

(52) U.S. Cl.
CPC .............. *H01B 1/023* (2013.01); *B29C 70/523* (2013.01); *H01B 5/105* (2013.01); *H01R 43/00* (2013.01)

(58) Field of Classification Search
USPC .......... 174/88 R, 128.1, 102 A, 102 R, 106 R
See application file for complete search history.

(56) References Cited

U.S. PATENT DOCUMENTS

| 3,244,784 A | 4/1966 | Boggs |
|---|---|---|
| 3,706,216 A | 12/1972 | Weingarten |
| 3,795,524 A | 3/1974 | Sowman |
| 3,993,726 A | 11/1976 | Moyer |
| 4,047,965 A | 9/1977 | Karst et al. |

(Continued)

FOREIGN PATENT DOCUMENTS

| AU | 2010315935 | 5/2011 |
|---|---|---|
| CA | 2 823 637 | 7/2012 |

(Continued)

OTHER PUBLICATIONS

International Search Report and the Written Opinion in PCT/US2012/033077 dated Aug. 7, 2012. 12 pages.

(Continued)

*Primary Examiner* — Angel R Estrada
*Assistant Examiner* — Dimary Lopez-Cruz
(74) *Attorney, Agent, or Firm* — Merchant & Gould P.C.

(57) ABSTRACT

The present invention discloses electrical cables containing a cable core and a plurality of conductive elements surrounding the cable core. The cable core contains at least one composite core, and each composite core contains a rod which contains a plurality of unidirectionally aligned fiber rovings embedded within a thermoplastic polymer matrix, and surrounded by a capping layer.

20 Claims, 13 Drawing Sheets

(56) References Cited

U.S. PATENT DOCUMENTS

| | | | |
|---|---|---|---|
| 4,499,716 A | 2/1985 | Antal et al. |
| 4,549,920 A | 10/1985 | Cogswell et al. |
| 4,559,262 A | 12/1985 | Cogswell et al. |
| 4,588,538 A | 5/1986 | Chung et al. |
| 4,649,060 A | 3/1987 | Ishikawa et al. |
| 4,677,818 A | 7/1987 | Honda et al. |
| 4,680,224 A | 7/1987 | O'Connor |
| 4,767,841 A | 8/1988 | Goetz et al. |
| 4,779,563 A | 10/1988 | Ishikawa et al. |
| 4,792,481 A | 12/1988 | O'Connor et al. |
| 4,843,696 A | 7/1989 | Gentry et al. |
| 4,861,947 A | 8/1989 | Altermatt et al. |
| 4,877,643 A | 10/1989 | Ishikawa et al. |
| 4,954,462 A | 9/1990 | Wood et al. |
| 5,017,643 A | 5/1991 | Snelling et al. |
| 5,039,572 A * | 8/1991 | Bobsein et al. ............ 428/408 |
| 5,060,466 A | 10/1991 | Matsuda et al. |
| 5,066,536 A | 11/1991 | Cogswell et al. |
| 5,068,142 A | 11/1991 | Nose et al. |
| 5,073,413 A | 12/1991 | Koppernaes et al. |
| 5,075,381 A | 12/1991 | Gotoh et al. |
| 5,080,175 A | 1/1992 | Williams |
| 5,126,167 A | 6/1992 | Matsuno et al. |
| 5,130,193 A | 7/1992 | Ikeda |
| 5,149,581 A | 9/1992 | Matsuo et al. |
| 5,149,749 A | 9/1992 | Blackwell et al. |
| 5,159,157 A | 10/1992 | Diegmann |
| 5,171,942 A | 12/1992 | Powers |
| 5,176,775 A | 1/1993 | Montsinger |
| 5,198,621 A | 3/1993 | Kojima |
| 5,207,850 A | 5/1993 | Parekh |
| 5,210,128 A | 5/1993 | Johnson |
| 5,211,500 A | 5/1993 | Takaki et al. |
| 5,277,566 A | 1/1994 | Augustin et al. |
| 5,286,561 A | 2/1994 | Johnson et al. |
| 5,298,318 A | 3/1994 | Soules et al. |
| 5,319,003 A | 6/1994 | Gomez et al. |
| 5,324,563 A | 6/1994 | Rogers et al. |
| 5,364,657 A | 11/1994 | Throne |
| 5,374,694 A | 12/1994 | MacKenzie et al. |
| 5,424,388 A | 6/1995 | Chen et al. |
| 5,439,632 A | 8/1995 | Leach et al. |
| 5,462,618 A | 10/1995 | Rogers et al. |
| 5,468,327 A | 11/1995 | Pawlowicz et al. |
| 5,501,906 A | 3/1996 | Deve |
| 5,525,003 A | 6/1996 | Williams et al. |
| 5,529,652 A | 6/1996 | Asai et al. |
| 5,542,230 A | 8/1996 | Schütze |
| 5,554,826 A | 9/1996 | Gentry |
| 5,614,139 A | 3/1997 | Cutolo et al. |
| 5,658,513 A | 8/1997 | Amaike et al. |
| 5,700,417 A | 12/1997 | Fernyhough et al. |
| 5,705,241 A | 1/1998 | Schütze |
| 5,725,954 A | 3/1998 | Montsinger |
| 5,727,357 A | 3/1998 | Arumugasaamy et al. |
| 5,780,154 A | 7/1998 | Okano et al. |
| 5,783,129 A | 7/1998 | Shirai et al. |
| 5,788,908 A | 8/1998 | Murakami |
| 5,792,527 A | 8/1998 | Yoshimitsu et al. |
| 5,840,424 A | 11/1998 | McGrail et al. |
| 5,888,609 A | 3/1999 | Karttunen et al. |
| 5,895,808 A | 4/1999 | Schmid et al. |
| 5,935,508 A | 8/1999 | Fernyhough et al. |
| 6,003,356 A | 12/1999 | Mills et al. |
| 6,015,953 A | 1/2000 | Tosaka et al. |
| 6,048,598 A | 4/2000 | Bryan, III et al. |
| 6,117,551 A | 9/2000 | Nagata et al. |
| 6,180,232 B1 | 1/2001 | McCullough et al. |
| 6,244,014 B1 | 6/2001 | Barmakian |
| 6,245,425 B1 | 6/2001 | McCullough et al. |
| 6,248,262 B1 | 6/2001 | Kubotera et al. |
| 6,258,453 B1 | 7/2001 | Montsinger |
| 6,260,343 B1 | 7/2001 | Pourladian |
| 6,270,851 B1 | 8/2001 | Lee et al. |
| 6,329,056 B1 * | 12/2001 | Deve et al. ............ 428/389 |
| 6,334,293 B1 | 1/2002 | Poethke et al. |
| 6,336,495 B1 | 1/2002 | McCullough et al. |
| 6,344,270 B1 | 2/2002 | McCullough et al. |
| 6,346,325 B1 | 2/2002 | Edwards et al. |
| 6,391,959 B1 | 5/2002 | Ninomiya et al. |
| 6,447,927 B1 | 9/2002 | McCullough et al. |
| 6,455,143 B1 | 9/2002 | Ishibashi et al. |
| 6,460,597 B1 | 10/2002 | McCullough et al. |
| 6,485,796 B1 * | 11/2002 | Carpenter et al. ............ 427/601 |
| 6,528,729 B1 | 3/2003 | Kamata |
| 6,544,645 B1 | 4/2003 | McCullough et al. |
| 6,559,385 B1 | 5/2003 | Johnson et al. |
| 6,568,072 B2 | 5/2003 | Wilemon et al. |
| 6,656,316 B1 | 12/2003 | Dyksterhouse |
| 6,658,836 B2 | 12/2003 | Nguyen et al. |
| 6,723,451 B1 * | 4/2004 | McCullough et al. ........ 428/614 |
| 6,846,857 B1 | 1/2005 | Lindner |
| 6,861,131 B2 | 3/2005 | Evans |
| 6,872,343 B2 | 3/2005 | Edwards et al. |
| 7,015,395 B2 | 3/2006 | Goldsworthy et al. |
| 7,019,217 B2 | 3/2006 | Bryant |
| 7,041,909 B2 | 5/2006 | Hiel et al. |
| 7,059,091 B2 | 6/2006 | Paulshus et al. |
| 7,060,326 B2 | 6/2006 | Hiel et al. |
| 7,093,416 B2 * | 8/2006 | Johnson et al. ............ 57/212 |
| 7,131,308 B2 | 11/2006 | McCullough et al. |
| 7,179,522 B2 | 2/2007 | Hiel et al. |
| 7,211,319 B2 | 5/2007 | Hiel et al |
| 7,220,492 B2 | 5/2007 | Fick et al. |
| 7,291,263 B2 | 11/2007 | Ward et al. |
| 7,326,854 B2 | 2/2008 | Varkey |
| 7,368,162 B2 | 5/2008 | Hiel et al. |
| 7,402,753 B2 | 7/2008 | Varkey et al. |
| 7,438,971 B2 | 10/2008 | Bryant et al. |
| 7,547,843 B2 * | 6/2009 | Deve et al. ............ 174/40 R |
| 7,563,983 B2 | 7/2009 | Bryant |
| 7,608,783 B2 | 10/2009 | Bryant et al. |
| 7,650,742 B2 | 1/2010 | Ushijima |
| 7,683,262 B2 * | 3/2010 | Guery et al. ............ 174/102 R |
| 7,705,242 B2 | 4/2010 | Winterhalter |
| 7,211,319 C1 | 6/2010 | Hiel et al. |
| 7,752,754 B2 | 7/2010 | Goldsworthy et al. |
| 8,250,845 B2 | 8/2012 | Kimura et al. |
| 8,371,028 B2 | 2/2013 | Goldsworthy et al. |
| D688,625 S | 8/2013 | Fulk et al. |
| 8,519,664 B2 | 8/2013 | Rongve |
| 2002/0019182 A1 | 2/2002 | Ishibashi et al. |
| 2002/0041049 A1 | 4/2002 | McCullough |
| 2002/0189845 A1 | 12/2002 | Gorrell |
| 2003/0037529 A1 | 2/2003 | Hanna et al. |
| 2003/0082380 A1 | 5/2003 | Hager et al. |
| 2004/0098963 A1 | 5/2004 | Calleeuw et al. |
| 2004/0182597 A1 | 9/2004 | Smith et al. |
| 2004/0224590 A1 | 11/2004 | Rawa et al. |
| 2004/0265558 A1 | 12/2004 | Berard |
| 2005/0181228 A1 | 8/2005 | McCullough et al. |
| 2005/0186410 A1 | 8/2005 | Bryant et al. |
| 2005/0244231 A1 | 11/2005 | Liao et al. |
| 2006/0021729 A1 | 2/2006 | Werner et al. |
| 2006/0024489 A1 | 2/2006 | Werner et al. |
| 2006/0024490 A1 | 2/2006 | Werner et al. |
| 2006/0049541 A1 | 3/2006 | Sutton et al. |
| 2006/0204739 A1 | 9/2006 | Papke et al. |
| 2007/0128435 A1 | 6/2007 | Hiel et al. |
| 2007/0193767 A1 | 8/2007 | Guery et al. |
| 2007/0202331 A1 | 8/2007 | Davis et al. |
| 2007/0269645 A1 | 11/2007 | Raghavendran et al. |
| 2007/0271897 A1 | 11/2007 | Hanna et al. |
| 2008/0141614 A1 | 6/2008 | Knouff et al. |
| 2008/0250631 A1 | 10/2008 | Buckley |
| 2008/0282664 A1 | 11/2008 | Chou et al. |
| 2008/0282666 A1 | 11/2008 | Chou |
| 2009/0229452 A1 | 9/2009 | Milwich et al. |
| 2010/0038112 A1 | 2/2010 | Grether |
| 2010/0163275 A1 | 7/2010 | Hiel et al. |
| 2010/0181012 A1 | 7/2010 | Hiel et al. |
| 2010/0206606 A1 | 8/2010 | Winterhalter |

(56) References Cited

U.S. PATENT DOCUMENTS

2010/0293783 A1 11/2010 Goldsworthy et al.
2013/0221747 A1 8/2013 Molinari

FOREIGN PATENT DOCUMENTS

| | | |
|---|---|---|
| CA | 2 768 065 | 8/2013 |
| CN | 2071207 | 2/1991 |
| CN | 2637534 | 9/2004 |
| CN | 1220330 | 9/2005 |
| EP | 1724306 | 11/2006 |
| FR | 2 836 591 | 8/2003 |
| GB | 2240997 | 8/1991 |
| JP | 3119188 | 5/1991 |
| JP | H03-129606 | 6/1991 |
| JP | 5033278 | 2/1993 |
| JP | 5148780 | 6/1993 |
| JP | H06-007112 | 1/1994 |
| JP | 7279940 | 10/1995 |
| JP | 2004300609 | 10/2004 |
| KR | 2013-0074165 | 7/2013 |
| KR | 2013-0085780 | 7/2013 |
| WO | WO 2009/130525 | 10/2009 |
| WO | WO 2010/002878 | 1/2010 |
| WO | WO 2012/142096 | 10/2012 |
| WO | WO 2012/142098 | 10/2012 |
| WO | WO 2012/142107 | 10/2012 |
| WO | WO 2012-142129 | 10/2012 |

OTHER PUBLICATIONS

ASTM B 233-92 Designation, entitled "Standard Specification for Aluminum 1350 Drawing Stock for Electrical Purposes" published Oct. 1992; pp. 222-225.

Sato, et al. entitled "Development of a Low Sag Aluminum Conductor Carbon Fiber Reinforced for Transmission Lines," CIGRE, May 2002, 6 pages.

Gambone, L. R. entitled "Alternative Materials for Overhead Conductors," Dec. 1991, 80 pages.

\* cited by examiner

ELECTRICAL TRANSMISSION CABLES WITH COMPOSITE CORES

REFERENCE TO RELATED APPLICATIONS

This application claims the benefit of U.S. Provisional Application No. 61/474,423, filed on Apr. 12, 2011, and relates to U.S. Provisional Application No. 61/474,458, filed on Apr. 12, 2011, both of which are incorporated herein by reference in their entirety.

BACKGROUND OF THE INVENTION

Composite wire structures are commonly used as transmission lines or cables for transmitting electricity to users. Examples of composite transmission wire constructions include, for instance, aluminum conductor steel reinforced (ACSR) cable, aluminum conductor steel supported (ACSS) cable, aluminum conductor composite reinforced (ACCR) cable, and aluminum conductor composite core (ACCC) cable. ACSR and ACSS cables include an aluminum outer conducting layer surrounding a steel inner core. The transmission lines or cables are designed not only to efficiently transmit electricity, but also to be strong and temperature resistant, especially when the transmission lines are strung on towers and stretched over long distances.

It would be beneficial to produce cables with a composite core that are capable of achieving the desired strength, durability, and temperature performance demanded by applications such as overhead power transmission cables. Accordingly, it is to these ends that the present disclosure is directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Embodiments of the present invention may provide cables, e.g., electrical transmission cables for the overhead transmission of electricity, which may contain a cable core and conductive elements surrounding the cable core. The cable core may contain at least one composite core (the composite core also may be referred to as a composite strand or polymer composite strand). These core elements may serve as load-bearing members for the electrical transmission cable and, in some embodiments, these core elements may be non-conductive.

In accordance with one embodiment of the present invention, a composite core for the electrical cable is disclosed. Generally, the cables and cores disclosed herein may extend in a longitudinal direction. The composite core may comprise at least one rod that comprises a continuous fiber component comprising a plurality of consolidated thermoplastic impregnated rovings (the rod also may be referred to as a fiber core). The rovings may contain continuous fibers oriented in the longitudinal direction, and a thermoplastic matrix that embeds the fibers. The fibers may have a ratio of ultimate tensile strength to mass per unit length of greater than about 1,000 Megapascals per gram per meter (MPa/g/m). The continuous fibers may constitute from about 25 wt. % to about 80 wt. % of the rod and the thermoplastic matrix may constitute from about 20 wt. % to about 75 wt. % of the rod. A capping layer may surround the rod, and this capping layer may be free of continuous fibers. The composite core may have a minimum flexural modulus of about 10 Gigapascals (GPa).

In accordance with another embodiment of the present invention, a method for forming a composite core for an electrical transmission cable is disclosed. The method may comprise impregnating a plurality of rovings with a thermoplastic matrix and consolidating the rovings to form a ribbon, wherein the rovings may comprise continuous fibers oriented in the longitudinal direction. The fibers may have a ratio of ultimate tensile strength to mass per unit length of greater than about 1,000 MPa/g/m. The continuous fibers may constitute from about 25 wt. % to about 80 wt. % of the ribbon, and the thermoplastic matrix may constitute from about 20 wt. % to about 75 wt. % of the ribbon. The ribbon may be heated to a temperature at or above the softening temperature (or melting temperature) of the thermoplastic matrix and pulled through at least one forming die to compress and shape the ribbon into a rod. A capping layer may be applied to the rod to form the composite core.

In accordance with yet another embodiment of the present invention, a method of making an electrical cable is disclosed. This method may comprise providing a cable core comprising at least one composite core, and surrounding the cable core with a plurality of conductive elements. The composite core may comprise at least one rod comprising a plurality of consolidated thermoplastic impregnated rovings. The rovings may comprise continuous fibers oriented in the longitudinal direction and a thermoplastic matrix that embeds the fibers. The fibers may have a ratio of ultimate tensile strength to mass per unit length of greater than about 1,000 MPa/g/m. Typically, the rod may comprise from about 25 wt. % to about 80 wt. % fibers, and from about 20 wt. % to about 75 wt. % thermoplastic matrix. A capping layer may surround the at least one rod, and this capping layer generally may be free of continuous fibers. In these and other embodiments, the composite core may have a flexural modulus of greater than about 10 GPa.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects and embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various aspects and embodiments of the present invention. In the drawings.

DETAILED DESCRIPTION OF THE INVENTION

Figure 1:
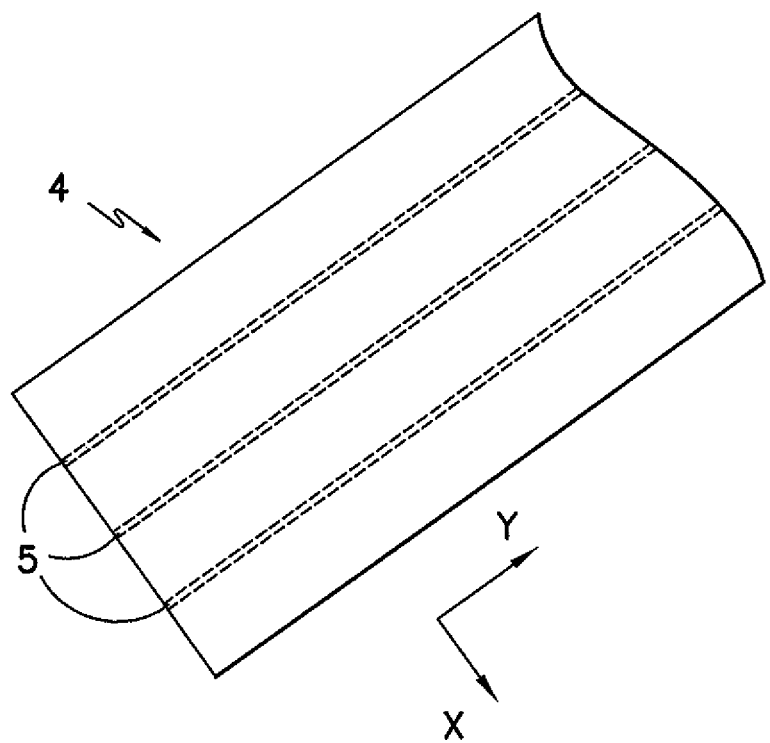
FIG. 1 is a perspective view of one embodiment of a consolidated ribbon for use in the present invention.

The following detailed description refers to the accompanying drawings. Wherever possible, the same or similar reference numbers are used in the drawings and the following description to refer to the same or similar elements or features. While aspects and embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description and its exemplary embodiments do not limit the scope of the invention.

The present invention is directed generally to electrical cables, such as high voltage overhead transmission lines, and to the composite cores contained within these electrical cables. In certain embodiments of the invention, an electrical cable may comprise a cable core comprising at least one composite core (or composite strand), and a plurality of conductive elements surrounding the cable core.

Composite Core

The composite core may contain a rod (or fiber core) comprising a continuous fiber component, surrounded by a capping layer. The rod may comprise a plurality of unidirectionally aligned fiber rovings embedded within a thermoplastic polymer matrix. While not wishing to be bound by theory, applicants believe that the degree to which the rovings are impregnated with the thermoplastic polymer matrix may be significantly improved through selective control over the impregnation process, and also through control over the degree of compression imparted to the rovings during formation and shaping of the rod, as well as the calibration of the final rod geometry. Such a well impregnated rod may have a very small void fraction, which may lead to excellent strength properties. Notably, the desired strength properties may be achieved without the need for different fiber types in the rod.

As used herein, the term "roving" generally refers to a bundle or tow of individual fibers. The fibers contained within the roving may be twisted or may be straight. Although different fibers may be used in individual or different rovings, it may be beneficial for each of the rovings to contain a single fiber type to minimize any adverse impact of using materials having different thermal expansion coefficients. The continuous fibers employed in the rovings may possess a high degree of tensile strength relative to their mass. For example, the ultimate tensile strength of the fibers typically may be in a range from about 1,000 to about 15,000 Megapascals (MPa), in some embodiments from about 2,000 MPa to about 10,000 MPa, and in some embodiments, from about 3,000 MPa to about 6000 MPa. Such tensile strengths may be achieved even though the fibers are of a relatively light weight, such as a mass per unit length of from about 0.1 to about 2 grams per meter (g/m), in some embodiments from about 0.4 to about 1.5 g/m. The ratio of tensile strength to mass per unit length thus may be about 1,000 Megapascals per gram per meter (MPa/g/m) or greater, in some embodiments about 4,000 MPa/g/m or greater, and in some embodiments, from about 5,500 to about 20,000 MPa/g/m. Such high strength fibers may, for instance, be metal fibers, glass fibers (e.g., E-glass, A-glass, C-glass, D-glass, AR-glass, R-glass, S1-glass, S2-glass, etc.), carbon fibers (e.g., amorphous carbon, graphitic carbon, or metal-coated carbon, etc.), boron fibers, ceramic fibers (e.g., alumina or silica), aramid fibers (e.g., Kevlar® marketed by E. I. duPont de Nemours, Wilmington, Del.), synthetic organic fibers (e.g., polyamide, polyethylene, paraphenylene, terephthalamide, polyethylene terephthalate and polyphenylene sulfide), and various other natural or synthetic inorganic or organic fibrous materials known for reinforcing thermoplastic and/or thermoset compositions. Carbon fibers may be particularly suitable for use as the continuous fibers, which typically have a tensile strength to mass per unit length ratio in the range of from about 5,000 to about 7,000 MPa/g/m. Often, the continuous fibers may have a nominal diameter of about 4 to about 35 micrometers (µm), and in some embodiments, from about 5 to about 35 µm. The number of fibers contained in each roving may be constant or may vary from roving to roving. Typically, a roving may contain from about 1,000 fibers to about 100,000 individual fibers, and in some embodiments, from about 5,000 to about 50,000 fibers.

Any of a variety of thermoplastic polymers may be employed to form the thermoplastic matrix in which the continuous fibers are embedded. Suitable thermoplastic polymers for use in the present invention may include, for instance, polyolefins (e.g., polypropylene, propylene-ethylene copolymers, etc.), polyesters (e.g., polybutylene terephalate (PBT)), polycarbonates, polyamides (e.g., Nylon™) polyether ketones (e.g., polyetherether ketone (PEEK)), polyetherimides, polyarylene ketones (e.g., polyphenylene diketone (PPDK)), liquid crystal polymers, polyarylene sulfides (e.g., polyphenylene sulfide (PPS), poly(biphenylene sulfide ketone), poly(phenylene sulfide diketone), poly(biphenylene sulfide), etc.), fluoropolymers (e.g., polytetrafluoroethylene-perfluoromethylvinylether polymer, perfluoroalkoxyalkane polymer, petrafluoroethylene polymer, ethylene-tetrafluoroethylene polymer, etc.), polyacetals, polyurethanes, polycarbonates, styrenic polymers (e.g., acrylonitrile butadiene styrene (ABS)), and the like, or combinations thereof.

Generally, the properties of the thermoplastic matrix may be selected to achieve a desired combination of processability and end-use performance of the composite core. For example, the melt viscosity of the thermoplastic matrix generally may be low enough so that the polymer may adequately impregnate the fibers and become shaped into the rod configuration. In this regard, the melt viscosity typically may range from about 25 to about 2,000 Pascal-seconds (Pa-s), in some embodiments from 50 about 500 Pa-s, and in some embodiments, from about 60 to about 200 Pa-s, determined at the operating conditions used for the thermoplastic polymer (e.g., about 360° C.). Likewise, because the core may be used at high temperatures (e.g., in high voltage transmission cables), a thermoplastic polymer having a relatively high melting temperature may be employed. For example, the melting temperature of such high temperature polymers may be in a range from about 200° C. to about 500° C., in some embodiments from about 225° C. to about 400° C., and in some embodiments, from about 250° C. to about 350° C.

In particular embodiments contemplated herein, polyarylene sulfides may be used in the present invention as a high temperature matrix with the desired melt viscosity. Polyphenylene sulfide, for example, is a semi-crystalline resin that generally includes repeating monomeric units represented by the following general formula:

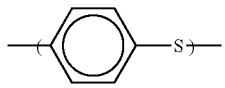

These monomeric units may constitute at least 80 mole %, and in some embodiments, at least 90 mole %, of the recurring units, in the polymer. It should be understood, however, that the polyphenylene sulfide may contain additional recurring units, such as described in U.S. Pat. No. 5,075,381 to Gotoh, et al., which is incorporated herein in its entirety by reference thereto for all purposes. When employed, such additional recurring units typically may constitute less than about 20 mole % of the polymer. Commercially available high melt viscosity polyphenylene sulfides may include those available from Ticona, LLC (Florence, Ky.) under the trade designation FORTRON®. Such polymers may have a melting temperature of about 285° C. (determined according to ISO 11357-1,2,3) and a melt viscosity of from about 260 to about 320 Pa-s at 310° C.

According to the present invention, an extrusion device generally may be employed to impregnate the rovings with the thermoplastic matrix. Among other things, the extrusion device may facilitate the application of the thermoplastic polymer to the entire surface of the fibers. The impregnated rovings also may have a very low void fraction, which may increase the resulting strength of the rod. For instance, the void fraction may be about 6% or less, in some embodiments about 4% or less, in some embodiments about 3% or less, in some embodiments about 2% or less, in some embodiments about 1% or less, and in some embodiments, about 0.5% or less. The void fraction may be measured using techniques well known to those skilled in the art. For example, the void fraction may be measured using a "resin burn off" test in which samples are placed in an oven (e.g., at 600° C. for 3 hours) to burn off the resin. The mass of the remaining fibers may then be measured to calculate the weight and volume fractions. Such "burn off" testing may be performed in accordance with ASTM D 2584-08 to determine the weights of the fibers and the thermoplastic matrix, which may then be used to calculate the "void fraction" based on the following equations:

$$V_f = 100 \ast (\rho_t - \rho_c)/\rho_t$$

where, $V_f$ is the void fraction as a percentage;
$\rho_c$ is the density of the composite as measured using known techniques, such as with a liquid or gas pycnometer (e.g., helium pycnometer);
$\rho_t$ is the theoretical density of the composite as is determined by the following equation:

$$\rho_t = 1/[W_f/\rho_f + W_m/\rho_m]$$

$\rho_m$ is the density of the thermoplastic matrix (e.g., at the appropriate crystallinity);
$\rho_f$ is the density of the fibers;
$W_f$ is the weight fraction of the fibers; and
$W_m$ is the weight fraction of the thermoplastic matrix.

Alternatively, the void fraction may be determined by chemically dissolving the resin in accordance with ASTM D 3171-09. The "burn off" and "dissolution" methods may be particularly suitable for glass fibers, which are generally resistant to melting and chemical dissolution. In other cases, however, the void fraction may be indirectly calculated based on the densities of the thermoplastic polymer, fibers, and ribbon (or tape) in accordance with ASTM D 2734-09 (Method A), where the densities may be determined by ASTM D792-08 Method A. Of course, the void fraction also may be estimated using conventional microscopy equipment, or through the use of computed tomography (CT) scan equipment, such as a Metrotom 1500 (2 k×2 k) high resolution detector.

Figure 3:
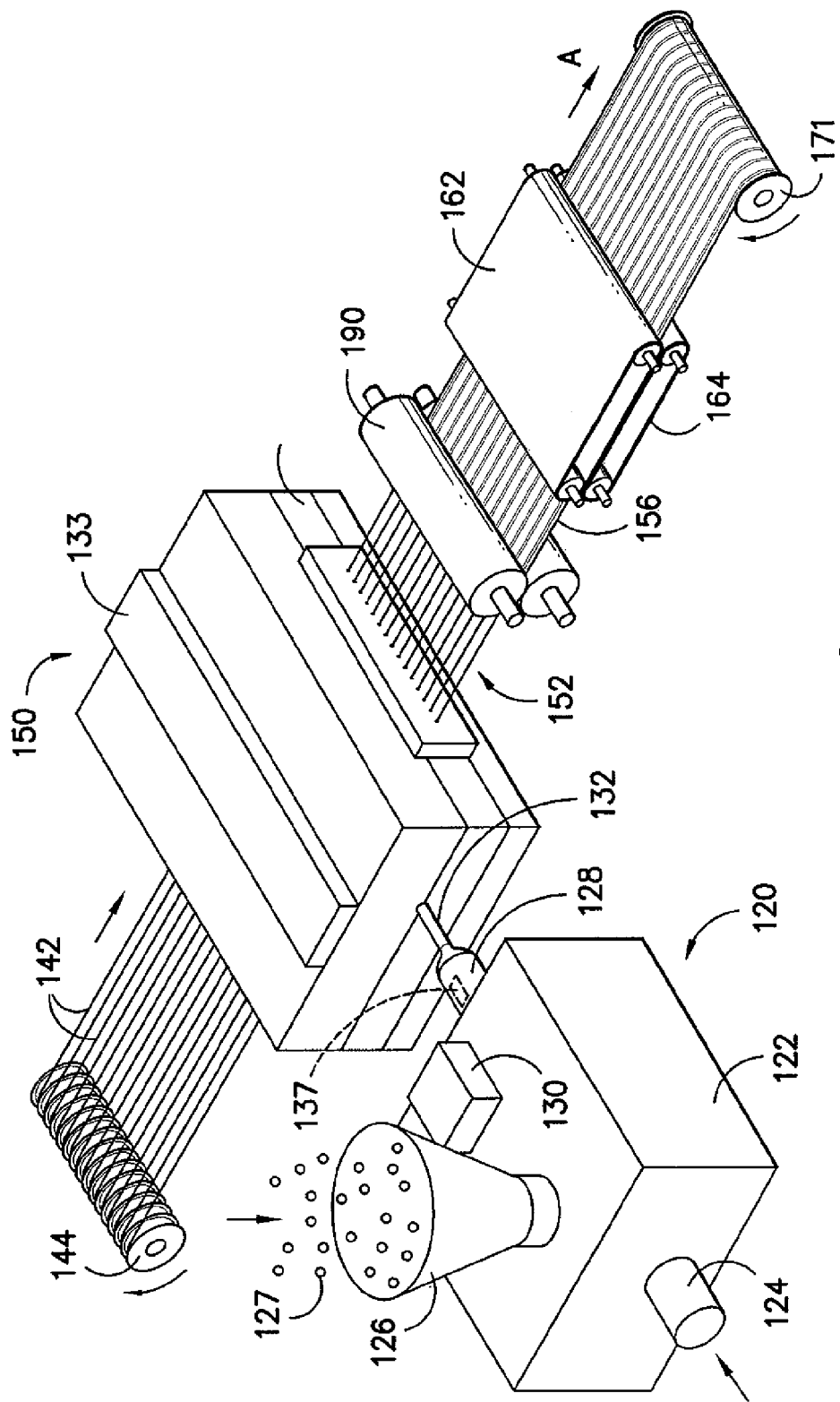
FIG. 3 is a schematic illustration of one embodiment of an impregnation system for use in the present invention.

Referring to FIG. 3, one embodiment of an extrusion device is shown. More particularly, the apparatus may include an extruder 120 containing a screw shaft 124 mounted inside a barrel 122. A heater 130 (e.g., an electrical resistance heater) may be mounted outside the barrel 122. During use, a thermoplastic polymer feedstock 127 may be supplied to the extruder 120 through a hopper 126. The thermoplastic feedstock 127 may be conveyed inside the barrel 122 by the screw shaft 124 and heated by frictional forces inside the barrel 122 and by the heater 130. Upon being heated, the feedstock 127 may exit the barrel 122 through a barrel flange 128 and enter a die flange 132 of an impregnation die 150.

A continuous fiber roving 142 or a plurality of continuous fiber rovings 142 may be supplied from a reel or reels 144 to die 150. Generally, the rovings 142 may be kept apart a certain distance before impregnation, such as at least about 4 mm, and in some embodiments, at least about 5 mm. The feedstock 127 may further be heated inside the die by heaters 133 mounted in or around the die 150. The die generally may be operated at temperatures that are sufficient to cause melting and impregnation of the thermoplastic polymer. Typically, the operation temperatures of the die may be higher than the melt temperature of the thermoplastic polymer, such as at temperatures from about 200° C. to about 450° C. When processed in this manner, the continuous fiber rovings 142 may become embedded in the polymer matrix, which may be a resin 214 (FIG. 4) processed from the feedstock 127. The mixture then may be extruded from the impregnation die 150 to create an extrudate 152.

A pressure sensor 137 (FIG. 3) may monitor the pressure near the impregnation die 150, so that the extruder 120 can be operated to deliver a correct amount of resin 214 for interaction with the fiber rovings 142. The rate of extrusion may be varied by controlling the rotational speed of the screw shaft 124 and/or feed rate of the feedstock 127. The extruder 120 may be operated to produce the extrudate 152 (impregnated fiber rovings), which after leaving the impregnation die 150, may enter an optional pre-shaping or guiding section (not shown), before entering a nip formed between two adjacent rollers 190. The rollers 190 may help to consolidate the extrudate 152 into the form of a ribbon (or tape), as well as to enhance fiber impregnation and to squeeze out any excess voids. In addition to the rollers 190, other shaping devices also may be employed, such as a die system. The resulting consolidated ribbon 156 may be pulled by tracks 162 and 164 mounted on rollers. The tracks 162 and 164 also may pull the extrudate 152 from the impregnation die 150 and through the rollers 190. If desired, the consolidated ribbon 156 may be wound up at a section 171. Generally speaking, the ribbons may be relatively thin and may have a thickness of from about 0.05 to about 1 millimeter (mm), in some embodiments from about 0.1 to about 0.8 mm, and in some embodiments, from about 0.2 to about 0.4 mm.

Within the impregnation die, it may be beneficial that the rovings 142 are traversed through an impregnation zone 250 to impregnate the rovings with the polymer resin 214. In the impregnation zone 250, the polymer resin may be forced generally transversely through the rovings by shear and pressure created in the impregnation zone 250, which may significantly enhance the degree of impregnation. This may be particularly useful when forming a composite from ribbons of a high fiber content, such as about 35% weight fraction (Wf) or more, and in some embodiments, from about 40% Wf or more. Typically, the die 150 may include a plurality of contact surfaces 252, such as, for example, at least 2, at least 3, from 4 to 7, from 2 to 20, from 2 to 30, from 2 to 40, from 2 to 50, or more contact surfaces 252, to create a sufficient degree of penetration and pressure on the rovings 142. Although their particular form may vary, the contact surfaces 252 typically may possess a curvilinear surface, such as a curved lobe, rod, etc. The contact surfaces 252 typically may be made of a metal material.

Figure 4:
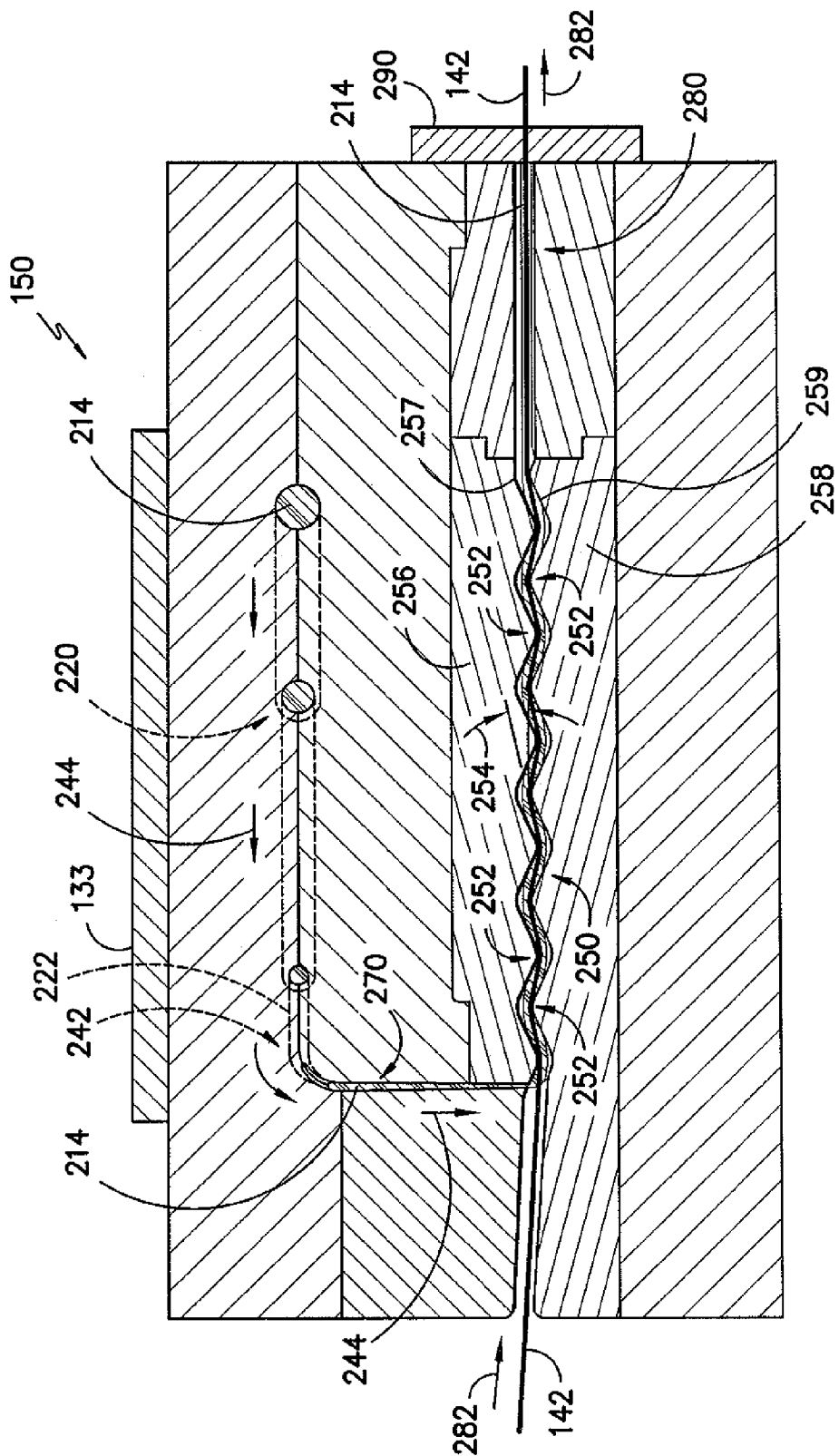
FIG. 4 is a cross-sectional view of the impregnation die shown in FIG. 3.

FIG. 4 shows a cross-sectional view of an impregnation die 150. As shown, the impregnation die 150 may include a manifold assembly 220, a gate passage 270, and an impregnation zone 250. The manifold assembly 220 may be provided for flowing the polymer resin 214 therethrough. For example, the manifold assembly 220 may include a channel 222 or a plurality of channels 222. The resin 214 provided to the impregnation die 150 may flow through the channels 222.

Figure 5:
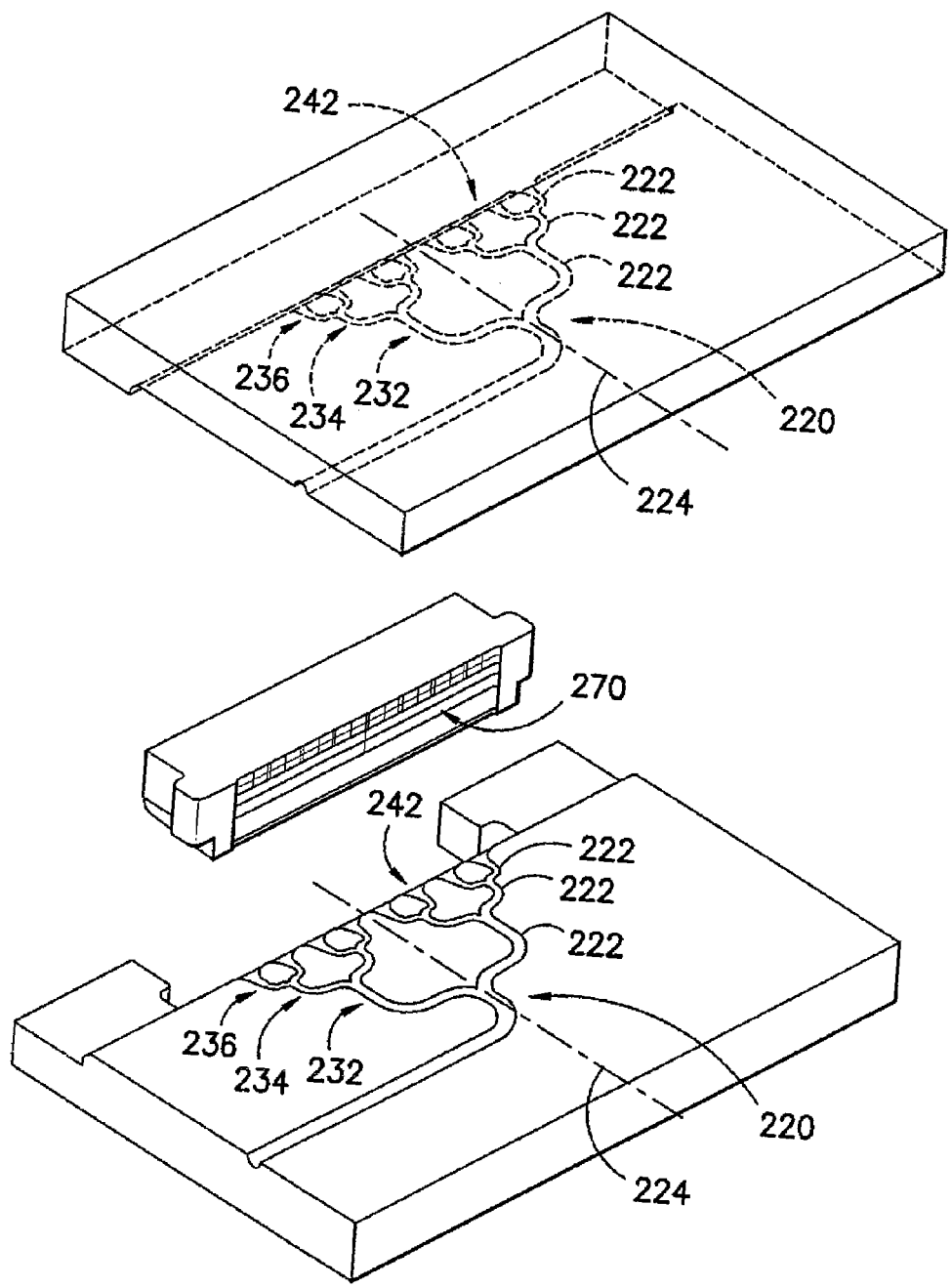
FIG. 5 is an exploded view of one embodiment of a manifold assembly and gate passage for an impregnation die that may be employed in the present invention.

As shown in FIG. 5, some portions of the channels 222 may be curvilinear, and in exemplary embodiments, the channels 222 may have a symmetrical orientation along a central axis 224. Further, in some embodiments, the channels may be a plurality of branched runners 222, which may include first branched runner group 232, second group 234, third group 236, and, if desired, more branched runner groups. Each group may include 2, 3, 4 or more runners 222 branching off from runners 222 in the preceding group, or from an initial channel 222.

The branched runners 222 and the symmetrical orientation thereof may evenly distribute the resin 214, such that the flow of resin 214 exiting the manifold assembly 220 and coating the rovings 142 may be substantially uniformly distributed on the rovings 142. Beneficially, this may result in generally uniform impregnation of the rovings 142.

Further, the manifold assembly 220 may in some embodiments define an outlet region 242, which generally encompasses at least a downstream portion of the channels or runners 222 from which the resin 214 exits. In some embodiments, at least a portion of the channels or runners 222 disposed in the outlet region 242 may have an increasing area in a flow direction 244 of the resin 214. The increasing area may permit diffusion and further distribution of the resin 214 as the resin 214 flows through the manifold assembly 220, which may further result in substantially uniform distribution of the resin 214 on the rovings 142.

As further illustrated in FIGS. 4 and 5, after flowing through the manifold assembly 220, the resin 214 may flow through gate passage 270. Gate passage 270 may be positioned between the manifold assembly 220 and the impregnation zone 250, and may be configured for flowing the resin 214 from the manifold assembly 220 such that the resin 214 coats the rovings 142. Thus, resin 214 exiting the manifold assembly 220, such as through outlet region 242, may enter gate passage 270 and flow therethrough, as shown.

Upon exiting the manifold assembly 220 and the gate passage 270 of the die 150 as shown in FIG. 4, the resin 214 may contact the rovings 142 being traversed through the die 150. As discussed above, the resin 214 may substantially uniformly coat the rovings 142, due to distribution of the resin 214 in the manifold assembly 220 and the gate passage 270. Further, in some embodiments, the resin 214 may impinge on an upper surface of each of the rovings 142, or on a lower surface of each of the rovings 142, or on both an upper and lower surface of each of the rovings 142. Initial impingement on the rovings 142 may provide for further impregnation of the rovings 142 with the resin 214.

Figure 6:
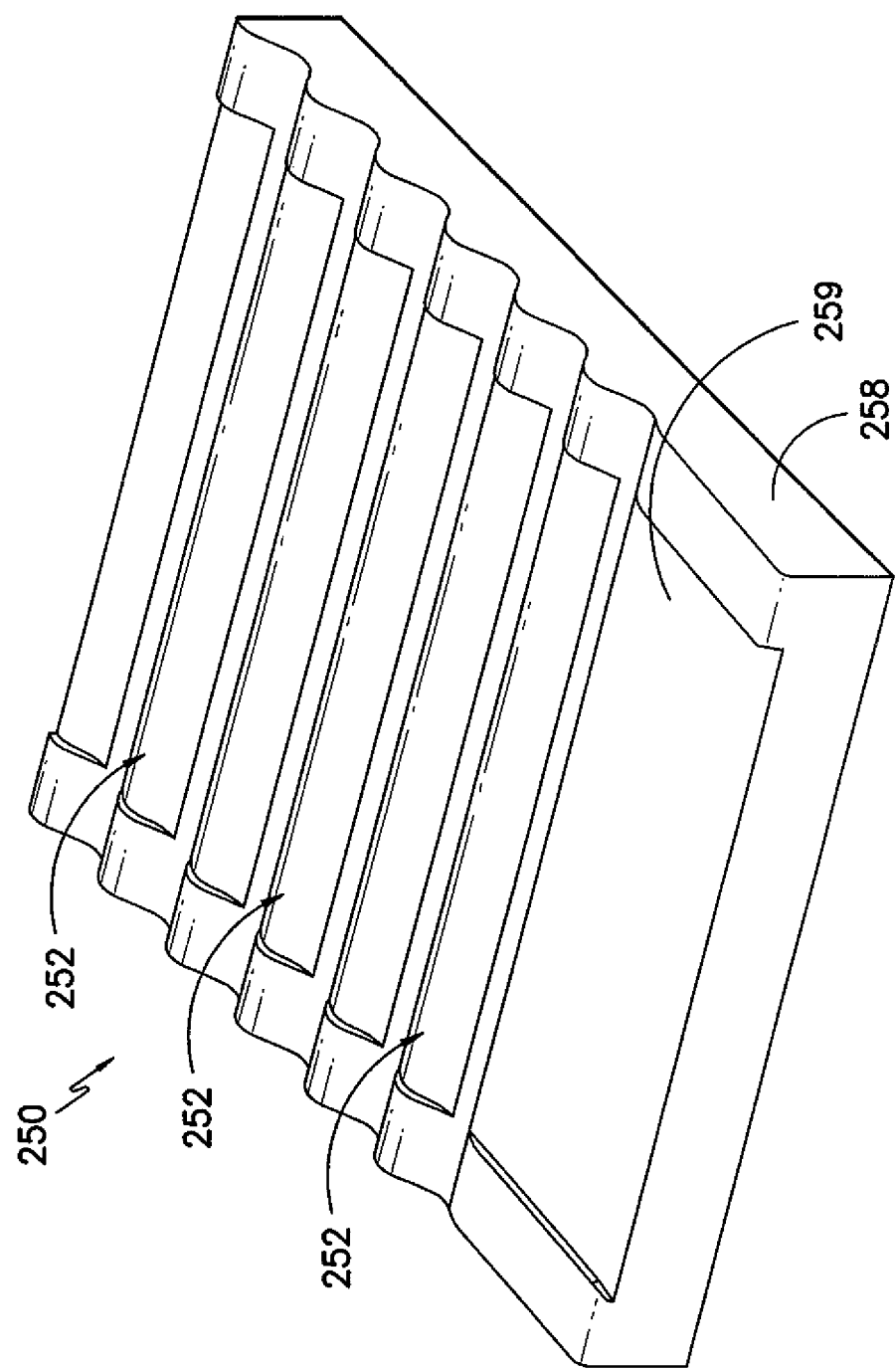
FIG. 6 is a perspective view of one embodiment of a plate at least partially defining an impregnation zone that may be employed in the present invention.

As shown in FIG. 4, the coated rovings 142 may traverse in run direction 282 through impregnation zone 250, which is configured to impregnate the rovings 142 with the resin 214. For example, as shown in FIGS. 4 and 6, the rovings 142 may be traversed over contact surfaces 252 in the impregnation zone. Impingement of the rovings 142 on the contact surface 252 may create shear and pressure sufficient to impregnate the rovings 142 with the resin 214, thereby coating the rovings 142.

In some embodiments, as shown in FIG. 4, the impregnation zone 250 may be defined between two spaced apart opposing plates 256 and 258. First plate 256 may define a first inner surface 257, while second plate 258 may define a second inner surface 259. The contact surfaces 252 may be defined on or extend from both the first and second inner surfaces 257 and 259, or only one of the first and second inner surfaces 257 and 259. FIG. 6 illustrates the second plate 258 and the various contact surfaces thereon that may form at least a portion of the impregnation zone 250 according to these embodiments. In exemplary embodiments, as shown in FIG. 4, the contact surfaces 252 may be defined alternately on the first and second surfaces 257 and 259 such that the rovings alternately impinge on contact surfaces 252 on the first and second surfaces 257 and 259. Thus, the rovings 142 may pass contact surfaces 252 in a waveform, tortuous, or sinusoidal-type pathway, which enhances shear.

Angle 254 at which the rovings 142 traverse the contact surfaces 252 may be generally high enough to enhance shear, but not so high as to cause excessive forces that will break the fibers. Thus, for example, the angle 254 may be in the range between approximately 1° and approximately 30°, and in some embodiments, between approximately 5° and approximately 25°.

In alternative embodiments, the impregnation zone 250 may include a plurality of pins (not shown), each pin having a contact surface 252. The pins may be static, freely rotational, or rotationally driven. In further alternative embodiments, the contact surfaces 252 and impregnation zone 250 may comprise any suitable shapes and/or structures for impregnating the rovings 142 with the resin 214 as desired or required.

To further facilitate impregnation of the rovings 142, they also may be kept under tension while present within the impregnation die. The tension may, for example, range from about 5 to about 300 Newtons (N), in some embodiments from about 50 to about 250 N, and in some embodiments, from about 100 to about 200 N, per roving 142 or tow of fibers.

As shown in FIG. 4, in some embodiments, a land zone 280 may be positioned downstream of the impregnation zone 250 in run direction 282 of the rovings 142. The rovings 142 may traverse through the land zone 280 before exiting the die 150. As further shown in FIG. 4, in some embodiments, a faceplate 290 may adjoin the impregnation zone 250. Faceplate 290 may be generally configured to meter excess resin 214 from the rovings 142. Thus, apertures in the faceplate 290, through which the rovings 142 traverse, may be sized such that when the rovings 142 are traversed therethrough, the size of the apertures may cause excess resin 214 to be removed from the rovings 142.

The impregnation die shown and described above is but one of various possible configurations that may be employed in the present invention. In alternative embodiments, for example, the rovings may be introduced into a crosshead die that may be positioned at an angle relative to the direction of flow of the polymer melt. As the rovings move through the crosshead die and reach the point where the polymer exits from an extruder barrel, the polymer may be forced into contact with the rovings. Examples of such a crosshead die extruder are described, for instance, in U.S. Pat. No. 3,993,726 to Moyer; U.S. Pat. No. 4,588,538 to Chung, et al.; U.S. Pat. No. 5,277,566 to Augustin, et al.; and U.S. Pat. No. 5,658,513 to Amaike, et al., which are incorporated herein in their entirety by reference thereto for all purposes. It should also be understood that any other extruder design also may be employed, such as a twin screw extruder. Still further, other components optionally may be employed to assist in the impregnation of the fibers. For example, a "gas jet" assembly may be employed in certain embodiments to help uniformly spread a roving of individual fibers, which may each contain up to as many as 24,000 fibers, across the entire width of the merged tow. This may help achieve uniform distribution of strength properties. Such an assembly may include a supply of compressed air or another gas that may impinge in a generally perpendicular fashion on the moving rovings that pass across the exit ports. The spread rovings then may be introduced into a die for impregnation, such as described above.

Regardless of the technique employed, the continuous fibers may be oriented in the longitudinal direction (the machine direction "A" of the system of FIG. 3) to enhance tensile strength. Besides fiber orientation, other aspects of the pultrusion process also may be controlled to achieve the desired strength. For example, a relatively high percentage of continuous fibers may be employed in the consolidated ribbon to provide enhanced strength properties. For instance, continuous fibers typically may constitute from about 25 wt. % to about 80 wt. %, in some embodiments from about 30 wt. % to about 75 wt. %, and in some embodiments, from about 35 wt. % to about 60 wt. % of the ribbon. Likewise, thermoplastic polymer(s) typically may constitute from about 20 wt. % to about 75 wt. %, in some embodiments from about 25 wt. % to about 70 wt. %, and in some embodiments, from about 40 wt. % to about 65 wt. % of the ribbon. The percentage of the fibers and thermoplastic matrix in the final rod also may be within the ranges noted above.

Figure 2:
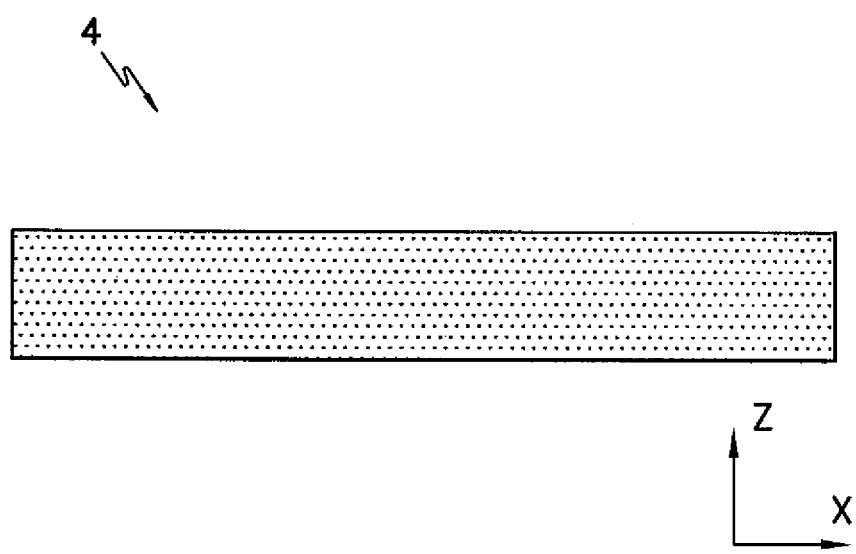
FIG. 2 is a cross-sectional view of another embodiment of a consolidated ribbon for use in the present invention.

As noted above, the rovings may be consolidated into the form of one or more ribbons before being shaped into the desired rod configuration. When such a ribbon is subsequently compressed, the rovings may become distributed in a generally uniform manner about a longitudinal center of the rod. Such a uniform distribution enhances the consistency of the strength properties (e.g., flexural modulus, ultimate tensile strength, etc.) over the entire length of the rod. When employed, the number of consolidated ribbons used to form the rod may vary based on the desired thickness and/or cross-sectional area and strength of the rod, as well as the nature of the ribbons themselves. In most cases, however, the number of ribbons may be from 1 to 20, and in some embodiments, from 2 to 10. The number of rovings employed in each ribbon may likewise vary. Typically, however, a ribbon may contain from 2 to 10 rovings, and in some embodiments, from 3 to 5 rovings. To help achieve the symmetric distribution of the rovings in the final rod, it may be beneficial that they are spaced apart approximately the same distance from each other within the ribbon. Referring to FIG. 1, for example, one embodiment of a consolidated ribbon 4 is shown that contains three (3) rovings 5 spaced equidistant from each other in the −x direction. In other embodiments, however, it may be desired that the rovings are combined, such that the fibers of the rovings are generally evenly distributed throughout the ribbon 4. In these embodiments, the rovings may be generally indistinguishable from each other. Referring to FIG. 2, for example, one embodiment of a consolidated ribbon 4 is shown that contains rovings that are combined such that the fibers are generally evenly distributed throughout.

Figure 7:
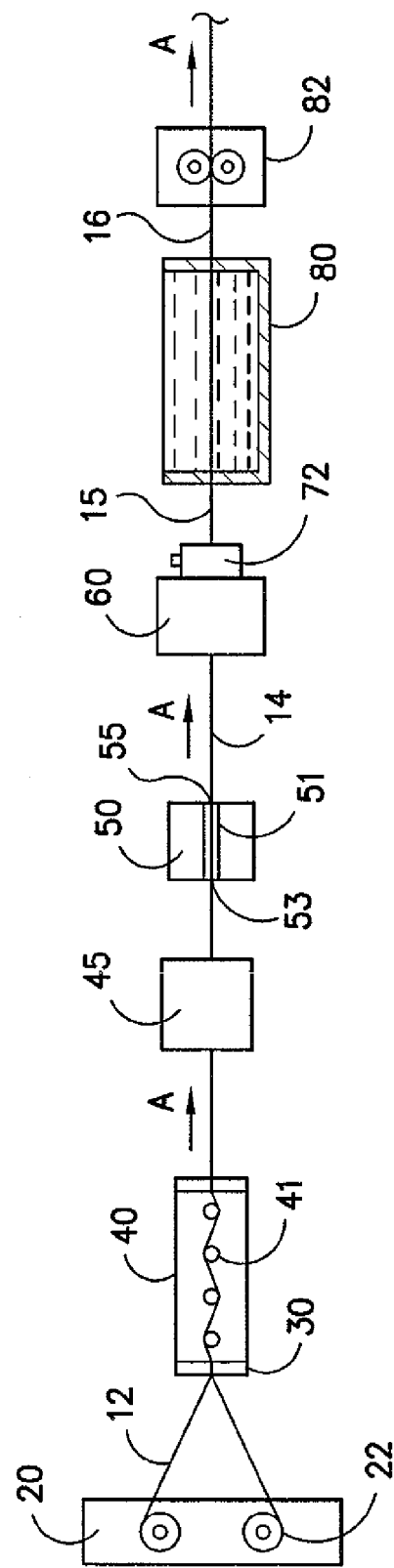
FIG. 7 is a schematic illustration of one embodiment of a pultrusion system that may be employed in the present invention.

The specific manner in which the rovings are shaped also may be carefully controlled to ensure that rod may be formed with an adequate degree of compression and strength properties. Referring to FIG. 7, for example, one particular embodiment of a system and method for forming a rod is shown. In this embodiment, two ribbons 12 initially may be provided in a wound package on a creel 20. The creel 20 may be an unreeling creel that includes a frame provided with horizontal spindles 22, each supporting a package. A pay-out creel also may be employed, particularly if desired to induce a twist into the fibers, such as when using raw fibers in a one-step configuration. It should also be understood that the ribbons also may be formed in-line with the formation of the rod. In one embodiment, for example, the extrudate 152 exiting the impregnation die 150 from FIG. 3 may be supplied directly to the system used to form a rod. A tension-regulating device 40 also may be employed to help control the degree of tension in the ribbons 12. The device 40 may include inlet plate 30 that lies in a vertical plane parallel to the rotating spindles 22 of the creel 20 and/or perpendicular to the incoming ribbons. The tension-regulating device 40 may contain cylindrical bars 41 arranged in a staggered configuration so that the ribbon 12 may pass over and under these bars to define a wave pattern. The height of the bars may be adjusted to modify the amplitude of the wave pattern and control tension.

The ribbons 12 may be heated in an oven 45 before entering a consolidation die 50. Heating may be conducted using any known type of oven, such as an infrared oven, a convection oven, etc. During heating, the fibers in the ribbon may be unidirectionally oriented to optimize the exposure to the heat and maintain even heat across the entire ribbon. The temperature to which the ribbons 12 are heated generally may be high enough to soften the thermoplastic polymer to an extent that the ribbons may bond together. However, the temperature may not be so high as to destroy the integrity of the material. The temperature may, for example, range from about 100° C. to about 500° C., in some embodiments from about 200° C. to about 400° C., and in some embodiments, from about 250° C. to about 350° C. In one particular embodiment, for example, polyphenylene sulfide ("PPS") may be used as the polymer, and the ribbons may be heated to or above the melting point of PPS, which may be about 285° C.

Upon being heated, the ribbons 12 may be provided to a consolidation die 50 that may compress them together into a preform 14, as well as may align and form the initial shape of the rod. As shown generally in FIG. 7, for example, the ribbons 12 may be guided through a flow passage 51 of the die 50 in a direction "A" from an inlet 53 to an outlet 55. The passage 51 may have any of a variety of shapes and/or sizes to achieve the rod configuration. For example, the channel and rod configuration may be circular, elliptical, parabolic, trapezoidal, rectangular, etc. Within the die 50, the ribbons generally may be maintained at a temperature at or above the melting point of the thermoplastic matrix used in the ribbon to ensure adequate consolidation.

The desired heating, compression, and shaping of the ribbons 12 may be accomplished through the use of a die 50 having one or multiple sections. For instance, although not shown in detail herein, the consolidation die 50 may possess multiple sections that function together to compress and shape the ribbons 12 into the desired configuration. For instance, a first section of the passage 51 may be a tapered zone that initially may shape the material as it flows into the die 50. The tapered zone generally may possess a cross-sectional area that is larger at its inlet than at its outlet. For example, the cross-sectional area of the passage 51 at the inlet of the tapered zone may be about 2% or more, in some embodiments about 5% or more, and in some embodiments, from about 10% to about 20% greater than the cross-sectional area at the outlet of the tapered zone. Regardless, the cross-section of the flow passage typically may change gradually and smoothly within the tapered zone so that a balanced flow of the composite material through the die may be maintained. A shaping zone may follow the tapered zone, and may compress the material and provide a generally homogeneous flow therethrough. The shaping zone also may pre-shape the material into an intermediate shape that is similar to that of the rod, but typically of a larger cross-sectional area to allow for expansion of the thermoplastic polymer while heated to minimize the risk of backup within the die 50. The shaping zone also may include one or more surface features that impart a directional change to the preform. The directional change may force the material to be redistributed, resulting in a more even distribution of the fiber/resin in the final shape. This also may reduce the risk of dead spots in the die that may cause burning of the resin. For example, the cross-sectional area of the passage 51 at a shaping zone may be about 2% or more, in some embodiments about 5% or more, and in some embodiments, from about 10% to about 20% greater than the width of the preform 14. A die land also may follow the shaping zone to serve as an outlet for the passage 51. The shaping zone, tapered zone, and/or die land may be heated to a temperature at or above that of the glass transition temperature or melting point of the thermoplastic matrix.

If desired, a second die 60 (e.g., a calibration die) also may be employed to compress the preform 14 into the final shape of the rod. When employed, it may be beneficial to allow the preform 14 to cool briefly after exiting the consolidation die 50 and before entering the optional second die 60. This may allow the consolidated preform 14 to retain its initial shape before progressing further through the system. Typically, cooling may reduce the temperature of the exterior of the rod below the melting point temperature of the thermoplastic matrix to minimize and substantially prevent the occurrence of melt fracture on the exterior surface of the rod. The internal section of the rod, however, may remain molten to ensure compression when the rod enters the calibration die body. Such cooling may be accomplished by simply exposing the preform 14 to the ambient atmosphere (e.g., room temperature) or through the use of active cooling techniques (e.g., water bath or air cooling) as is known in the art. In one embodiment, for example, air may blown onto the preform 14 (e.g., with an air ring). The cooling between these stages, however, generally may occur over a small period of time to ensure that the preform 14 still may be soft enough to be further shaped. For example, after exiting the consolidation die 50, the preform 14 may be exposed to the ambient environment for only from about 1 to about 20 seconds, and in some embodiments, from about 2 to about 10 seconds, before entering the second die 60. Within the die 60, the preform generally may be kept at a temperature below the melting point of the thermoplastic matrix used in the ribbon so that the shape of the rod can be maintained. Although referred to above as single dies, it should be understood that the dies 50 and 60 may in fact be formed from multiple individual dies (e.g., face plate dies).

Thus, in some embodiments, multiple individual dies 60 may be utilized to gradually shape the material into the desired configuration. The dies 60 may be placed in series, and provide for gradual decreases in the dimensions of the material. Such gradual decreases may allow for shrinkage during and between the various steps.

Figure 11:
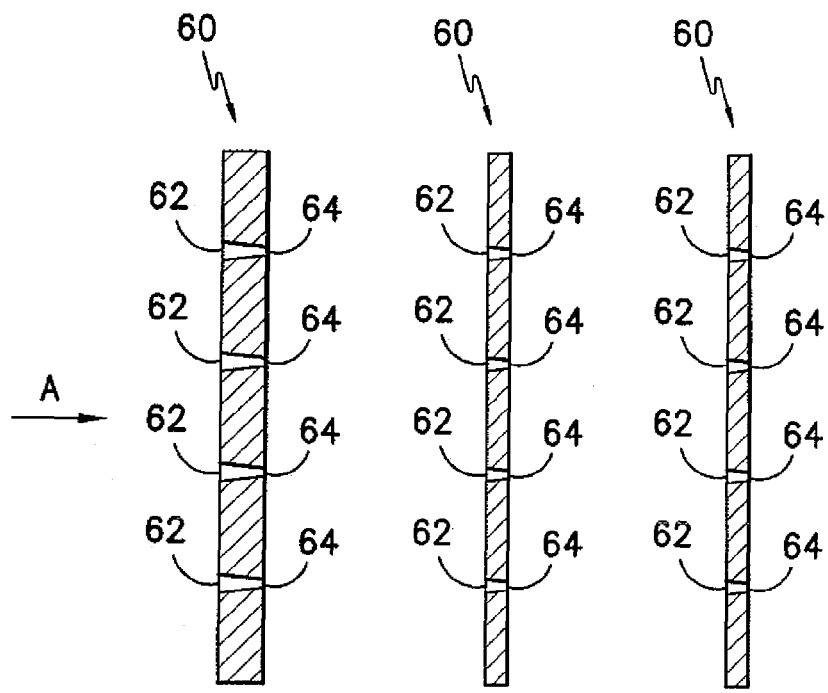
FIG. 11 is a top cross-sectional view of one embodiment of various calibration dies that may be employed in accordance with the present invention.
Figure 12:
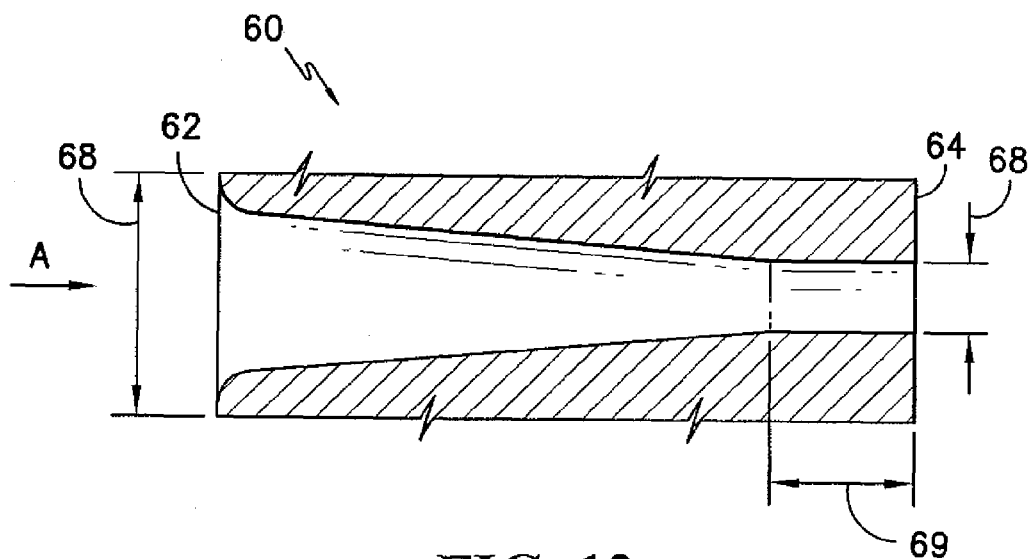
FIG. 12 is a side cross-sectional view of one embodiment of a calibration die that may be employed in accordance with the present invention.
Figure 13:
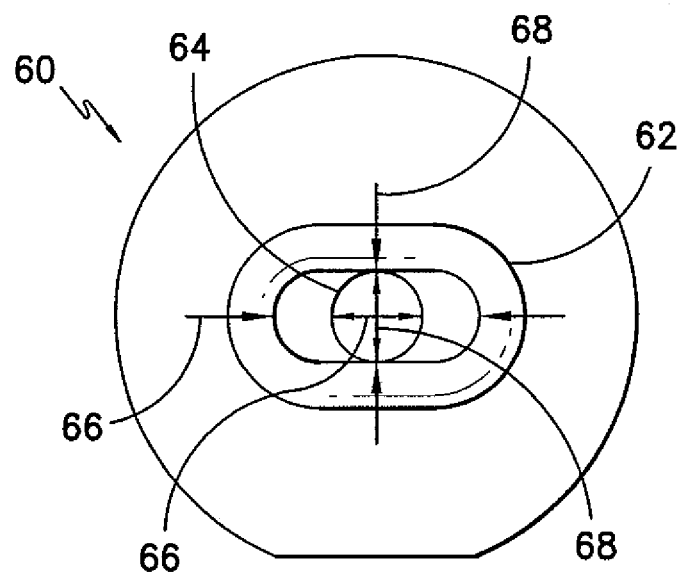
FIG. 13 is a front view of a portion of one embodiment of a calibration die that may be employed in accordance with the present invention.

For example, as shown in FIGS. 11 through 13, a first die 60 may include one or more inlets 62 and corresponding outlets 64, as shown. Any number of inlets 62 and corresponding outlets 64 may be included in a die 60, such as four as shown, or one, two, three, five, six, or more. An inlet 62 in some embodiments may be generally oval or circular shaped. In other embodiments, the inlet 62 may have a curved rectangular shape, i.e., a rectangular shape with curved corners or a rectangular shape with straight longer sidewalls and curved shorter sidewalls. Further, an outlet 64 may be generally oval or circular shaped, or may have a curved rectangular shape. In some embodiments wherein an oval shaped inlet is utilized, the inlet 62 may have a major axis length 66 to minor axis length 68 ratio in a range between approximately 3:1 and approximately 5:1. In some embodiments wherein an oval or circular shaped inlet is utilized, the outlet 64 may have a major axis length 66 to minor axis length 68 ratio in a range between approximately 1:1 and approximately 3:1. In embodiments wherein a curved rectangular shape is utilized, the inlet and outlet may have major axis length 66 to minor axis length 66 ratios (aspect ratios) between approximately 2:1 and approximately 7:1, and the outlet 64 ratio may be less than the inlet 62 ratio.

In further embodiments, the cross-sectional area of an inlet 62 and the cross-sectional area of a corresponding outlet 64 of the first die 60 may have a ratio in a range between approximately 1.5:1 and 6:1.

The first die 60 thus may provide a generally smooth transformation of polymer impregnated fiber material to a shape that is relatively similar to a final shape of the resulting rod, which in exemplary embodiments has a circular or oval shaped cross-section. Subsequent dies, such as a second die 60 and third die 60 as shown in FIG. 11, may provide for further gradual decreases and/or changes in the dimensions of the material, such that the shape of the material is converted to a final cross-sectional shape of the rod. These subsequent dies 60 may both shape and cool the material. For example, in some embodiments, each subsequent die 60 may be maintained at a lower temperature than the previous dies. In exemplary embodiments, all dies 60 may be maintained at temperatures that are higher than a softening point temperature for the material.

In further exemplary embodiments, dies 60 having relatively long land lengths 69 may be desired, due to, for example, proper cooling and solidification, which may be important in achieving a desired rod shape and size. Relatively long land lengths 69 may reduce stresses and provide smooth transformations to desired shapes and sizes, and with minimal void fraction and bow characteristics. In some embodiments, for example, a ratio of land length 69 at an outlet 64 to major axis length 66 at the outlet 64 for a die 60 may be in the range between 0 and approximately 20, such as between approximately 2 and approximately 6.

The use of calibration dies 60 according to the present disclosure may provide for gradual changes in material cross-section, as discussed. These gradual changes may in exemplary embodiments ensure that the resulting product, such as a rod or other suitable product, has a generally uniform fiber distribution with relatively minimal void fraction.

It should be understood that any suitable number of dies 60 may be utilized to gradually form the material into a profile having any suitable cross-sectional shape, as desired or as required by various end-use applications.

Figure 14:
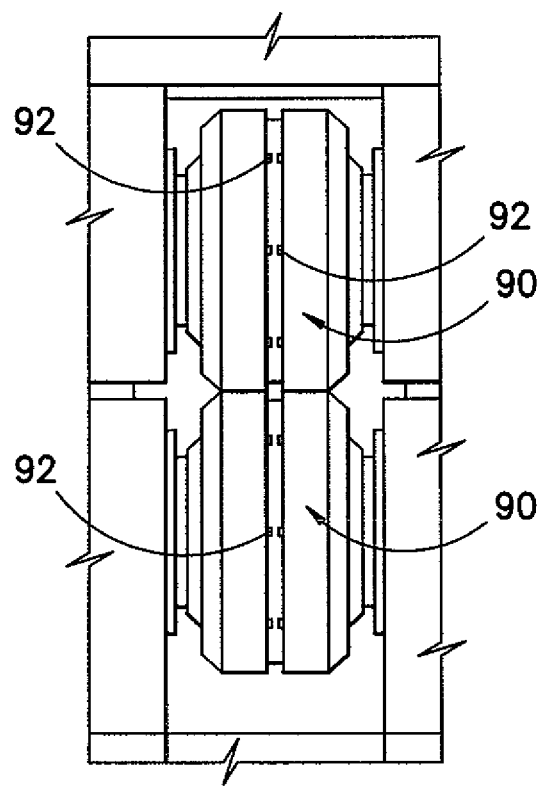
FIG. 14 is a front view of one embodiment of forming rollers that may be employed in accordance with the present invention.

In addition to the use of one or more dies, other mechanisms also may be employed to help compress the preform 14 into the shape of a rod. For example, forming rollers 90, as shown in FIG. 14, may be employed between the consolidation die 50 and the calibration die 60, between the various calibration dies 60, and/or after the calibration dies 60 to further compress the preform 14 before it is converted into its final shape. The rollers may have any configuration, such as pinch rollers, overlapping rollers, etc., and may be vertical as shown or horizontal rollers. Depending on the roller 90 configuration, the surfaces of the rollers 90 may be machined to impart the dimensions of the final product, such as the rod, core, profile, or other suitable product, to the preform 14. In an exemplary embodiment, the pressure of the rollers 90 may be adjustable to optimize the quality of the final product.

The rollers 90 in exemplary embodiments, such as at least the portions contacting the material, may have generally smooth surfaces. For example, relatively hard, polished surfaces may be beneficial in many embodiments. For example, the surface of the rollers may be formed from a relatively smooth chrome or other suitable material. This may allow the rollers 90 to manipulate the preform 14 without damaging or undesirably altering the preform 14. For example, such surfaces may prevent the material from sticking to the rollers, and the rollers may impart smooth surfaces onto the materials.

In some embodiments, the temperature of the rollers 90 may be controlled. This may be accomplished by heating of the rollers 90 themselves, or by placing the rollers 90 in a temperature controlled environment.

Further, in some embodiments, surface features 92 may be provided on the rollers 90. The surface features 92 may guide and/or control the preform 14 in one or more directions as it is passed through the rollers. For example, surface features 92 may be provided to prevent the preform 14 from folding over on itself as it is passed through the rollers 90. Thus, the surface features 92 may guide and control deformation of the preform 14 in the cross-machine direction relative to the machine direction A as well as in the vertical direction relative to the machine direction A. The preform 14 thus may be pushed together in the cross-machine direction, rather than folded over on itself, as it is passed through the rollers 90 in the machine direction A.

In some embodiments, tension regulation devices may be provided in communication with the rollers. These devices may be utilized with the rollers to apply tension to the preform 14 in the machine direction, cross-machine direction, and/or vertical direction to further guide and/or control the preform.

As indicated above, the resulting rod also may be applied with a capping layer to protect it from environmental conditions and/or to improve wear resistance. Referring again to FIG. 7, for example, such a capping layer may be applied via an extruder oriented at any desired angle to introduce a thermoplastic resin into a capping die 72. To help prevent a galvanic response, it may be beneficial for the capping material to have a dielectric strength of at least about 1 kV per millimeter (kV/mm), in some embodiments at least about 2 kV/mm, in some embodiments from about 3 kV/mm to about 50 kV/mm, and in some embodiments, from about 4 kV/mm to about 30 kV/mm, such as determined in accordance with ASTM D149-09. Suitable thermoplastic polymers for this purpose may include, for instance, polyolefins (e.g., polypropylene, propylene-ethylene copolymers, etc.), polyesters (e.g., polybutylene terephalate (PBT)), polycarbonates, polyamides (e.g., Nylon™), polyether ketones (e.g., polyetherether ketone (PEEK)), polyetherimides, polyarylene ketones (e.g., polyphenylene diketone (PPDK)), liquid crystal polymers, polyarylene sulfides (e.g., polyphenylene sulfide (PPS), poly(biphenylene sulfide ketone), poly(phenylene sulfide diketone), poly(biphenylene sulfide), etc.), fluoropolymers (e.g., polytetrafluoroethylene-perfluoromethylvinylether polymer, perfluoro-alkoxyalkane polymer, petrafluoroethylene polymer, ethylene-tetrafluoroethylene polymer, etc.), polyacetals, polyurethanes, polycarbonates, styrenic polymers (e.g., acrylonitrile butadiene styrene (ABS)), acrylic polymers, polyvinyl chloride (PVC), etc. Particularly suitable high dielectric strength capping layer materials may include polyketone (e.g., polyetherether ketone (PEEK)), polysulfide (e.g., polyarylene sulfide), or a mixture thereof.

The capping layer generally may be "free" of continuous fibers. That is, the capping layer may contain "less than about 10 wt. %" of continuous fibers, in some embodiments about 5 wt. % or less of continuous fibers, and in some embodiments, about 1 wt. % or less of continuous fibers (e.g., 0 wt. %). Nevertheless, the capping layer may contain other additives for improving the final properties of the composite core. Additive materials employed at this stage may include those that are not suitable for incorporating into the continuous fiber material. For instance, it may be beneficial to add pigments to reduce finishing labor, or it may be beneficial to add flame retardant agents to enhance the flame retardancy of the core. Because many additive materials may be heat sensitive, an excessive amount of heat may cause them to decompose and produce volatile gases. Therefore, if a heat sensitive additive material is extruded with an impregnation resin under high heating conditions, the result may be a complete degradation of the additive material. Additive materials may include, for instance, mineral reinforcing agents, lubricants, flame retardants, blowing agents, foaming agents, ultraviolet light resistant agents, thermal stabilizers, pigments, and combinations thereof. Suitable mineral reinforcing agents may include, for instance, calcium carbonate, silica, mica, clays, talc, calcium silicate, graphite, calcium silicate, alumina trihydrate, barium ferrite, and combinations thereof.

While not shown in detail herein, the capping die 72 may include various features known in the art to help achieve the desired application of the capping layer. For instance, the capping die 72 may include an entrance guide that aligns the incoming rod. The capping die also may include a heating mechanism (e.g., heated plate) that pre-heats the rod before application of the capping layer to help ensure adequate bonding. Following capping, the shaped part 15 then may be finally cooled using a cooling system 80 as is known in the art. The cooling system 80 may, for instance, be a sizing system that includes one or more blocks (e.g., aluminum blocks) that may completely encapsulate the composite core while a vacuum pulls the hot shape out against its walls as it cools. A cooling medium may be supplied to the sizer, such as air or water, to solidify the composite core in the correct shape.

Even if a sizing system is not employed, it may be beneficial to cool the composite core after it exits the capping die (or the consolidation or calibration die, if capping is not applied). Cooling may occur using any technique known in the art, such a water tank, cool air stream or air jet, cooling jacket, an internal cooling channel, cooling fluid circulation channels, etc. Regardless, the temperature at which the material is cooled may be controlled to achieve certain mechanical properties, part dimensional tolerances, good processing, and an aesthetically pleasing composite. For instance, if the temperature of the cooling station is too high, the material might swell in the tool and interrupt the process. For semi-crystalline materials, too low of a temperature likewise may cause the material to cool down too rapidly and not allow complete crystallization, thereby adversely affecting the mechanical and chemical resistance properties of the composite. Multiple cooling die sections with independent temperature control may be utilized to impart a beneficial balance of processing and performance attributes. In one particular embodiment, for example, a water tank may be employed at a temperature of from about 0° C. to about 30° C., in some embodiments from about 1° C. to about 20° C., and in some embodiments, from about 2° C. to about 15° C.

If desired, one or more sizing blocks (not shown) also may be employed, such as after capping. Such blocks may contain openings that are cut to the exact core shape, graduated from oversized at first to the final core shape. As the composite core passes therethrough, any tendency for it to move or sag may be counteracted, and it may be pushed back (repeatedly) to its correct shape. Once sized, the composite core may be cut to the desired length at a cutting station (not shown), such as with a cut-off saw capable of performing cross-sectional cuts, or the composite core may be wound on a reel in a continuous process. The length of rod and/or the composite core may be limited to the length of the fiber tow.

As will be appreciated, the temperature of the rod or composite core as it advances through any section of the system of the present invention may be controlled to yield certain manufacturing and final composite properties. Any or all of the assembly sections may be temperature controlled utilizing electrical cartridge heaters, circulated fluid cooling, etc., or any other temperature controlling device known to those skilled in the art.

Referring again to FIG. 7, a pulling device 82 may be positioned downstream from the cooling system 80 to pull the finished composite core 16 through the system for final sizing of the composite. The pulling device 82 may be any device capable of pulling the core through the process system at a desired rate. Typical pulling devices may include, for example, caterpillar pullers and reciprocating pullers.

Figure 8:
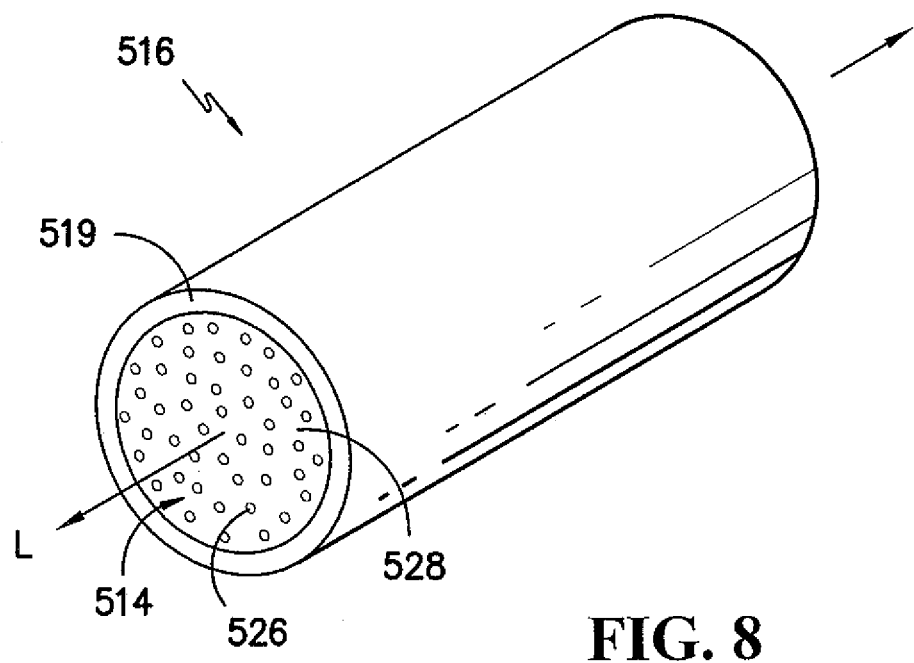
FIG. 8 is a perspective view of one embodiment of a composite core of the present invention.

One embodiment of the composite core (or composite strand) formed from the method described above is shown in more detail in FIG. 8 as element 516. As illustrated, the composite core 516 may have a substantially circular shape and may include a rod (or fiber core) 514 comprising one or more consolidated ribbons (a continuous fiber component). By "substantially circular," it is generally meant that the aspect ratio of the core (height divided by the width) is typically from about 1.0 to about 1.5, and in some embodiments, about 1.0. Due to the selective control over the process used to impregnate the rovings and form a consolidated ribbon, as well the process for compressing and shaping the ribbon, the composite core may comprise a relatively even distribution of the thermoplastic matrix across along its entire length. This also means that the continuous fibers may be distributed in a generally uniform manner about a longitudinal central axis "L" of the composite core 516. As shown in FIG. 8, for example, the rod 514 of the composite core 516 may include continuous fibers 526 embedded within a thermoplastic matrix 528. The fibers 526 may be distributed generally uniformly about the longitudinal axis "L." It should be understood that only a few fibers are shown in FIG. 8, and that the composite core typically may contain a substantially greater number of uniformly distributed fibers.

A capping layer 519 also may extend around the perimeter of the rod 514 and define an external surface of the composite core 516. The cross-sectional thickness of the rod 514 may be selected strategically to help achieve a particular strength for the composite core. For example, the rod 514 may have a thickness (e.g., diameter) of from about 0.1 to about 40 mm, in some embodiments from about 0.5 to about 30 mm, and in some embodiments, from about 1 to about 10 mm. The thickness of the capping layer 519 may depend on the intended function of the part, but typically may be from about 0.01 to about 10 mm, and in some embodiments, from about 0.02 to about 5 mm. The total cross-sectional thickness, or height, of the composite core 516 also may range from about 0.1 to about 50 mm, in some embodiments from about 0.5 to about 40 mm, and in some embodiments, from about 1 to about 20 mm (e.g., diameter, if a circular cross-section). While the composite core may be substantially continuous in length, the length of the composite core may be limited in practice by the spool onto which it will be wound and stored and/or by the length of the continuous fibers. For example, the length often may range from about 1,000 m to about 5,000 m, although even greater lengths are certainly possible.

Through control over the various parameters mentioned above, cores having very high strengths may be formed. For example, the composite cores may exhibit a relatively high flexural modulus. The term "flexural modulus" generally refers to the ratio of stress to strain in flexural deformation (units of force per unit area), or the tendency for a material to bend. It is determined from the slope of a stress-strain curve produced by a "three point flexural" test (such as ASTM D790-10, Procedure A, room temperature). For example, the composite core of the present invention may exhibit a flexural modulus of from about 10 GPa or more, in some embodiments from about 12 to about 400 GPa, in some embodiments from about 15 to about 200 GPa, and in some embodiments, from about 20 to about 150 GPa.

Composite cores used to produce electrical cables consistent with certain embodiments disclosed herein may have ultimate tensile strengths over about 300 MPa, such as, for instance, in a range from about 400 MPa to about 5,000 MPa, or from about 500 MPa to about 3,500 MPa. Further, suitable composite cores may have an ultimate tensile strength in a range from about 700 MPa to about 3,000 MPa; alternatively, from about 900 MPa to about 1,800 MPa; or alternatively, from about 1,100 MPa to about 1,500 MPa. The term "ultimate tensile strength" generally refers to the maximum stress that a material can withstand while being stretched or pulled before breaking, and is the maximum stress reached on a stress-strain curve produced by a tensile test (such as ASTM D3916-08) at room temperature.

Additionally or alternatively, the composite core may have a tensile modulus of elasticity, or elastic modulus, in a range from about 50 GPa to about 500 GPa, from about 70 GPa to about 400 GPa, from about 70 GPa to about 300 GPa, or from about 70 GPa to about 250 GPa. In certain embodiments, the composite core may have an elastic modulus in a range from about 70 GPa to about 200 GPa; alternatively, from about 70 GPa to about 150 GPa; or alternatively, from about 70 GPa to about 130 GPa. The term "tensile modulus of elasticity" or "elastic modulus" generally refers to the ratio of tensile stress over tensile strain and is the slope of a stress-strain curve produced by a tensile test (such as ASTM 3916-08) at room temperature.

Composite cores made according to the present disclosure may further have relatively high flexural fatigue life, and may exhibit relatively high residual strength. Flexural fatigue life and residual flexural strength may be determined based on a "three point flexural fatigue" test (such as ASTM D790, typically at room temperature). For example, the cores of the present invention may exhibit residual flexural strength after one million cycles at 160 Newtons ("N") or 180 N loads of from about 60 kilograms per square inch ("ksi") to about 115 ksi, in some embodiments from about 70 ksi to about 115 ksi, and in some embodiments from about 95 ksi to about 115 ksi. Further, the cores may exhibit relatively minimal reductions in flexural strength. For example, cores having void fractions of about 4% or less, in some embodiments about 3% or less, may exhibit reductions in flexural strength after three point flexural fatigue testing of about 1% (for example, from a maximum pristine flexural strength of about 106 ksi to a maximum residual flexural strength of about 105 ksi). Flexural strength may be tested before and after fatigue testing using, for example, a three point flexural test as discussed above.

In some embodiments, the composite core may have a density or specific gravity of less than about 2.5 g/cc, less than about 2.2 g/cc, less than about 2 g/cc, or less than about 1.8 g/cc. In other embodiments, the composite core density may be in a range from about 1 g/cc to about 2.5 g/cc; alternatively, from about 1.1 g/cc to about 2.2 g/cc; alternatively, from about 1.1 g/cc to about 2 g/cc; alternatively, from about 1.1 g/cc to about 1.9 g/cc; alternatively, from about 1.2 g/cc to about 1.8 g/cc; or alternatively, from about 1.3 g/cc to about 1.7 g/cc.

In some cable applications, such as in overhead transmission lines, the strength to weight ratio of the composite core may be important. The ratio may be quantified by the ratio of the tensile strength of the core material to the density of the core material (in units of MPa/(g/cc)). Illustrative and non-limiting strength to weight ratios of composite cores in accordance with embodiments of the present invention may be in a range from about 400 to about 1,300, from about 400 to about 1,200, from about 500 to about 1,100, from about 600 to about 1,100, from about 700 to about 1,100, from about 700 to about 1,000, or from about 750 to about 1,000. Again, the ratios are based on the tensile strength in MPa, and the composite core density in g/cc.

In some embodiments, the percent elongation at break for the composite core may be less than 4%, less than 3%, or less than 2%, while in other embodiments, the elongation at break may be in a range from about 0.5% to about 2.5%, from about 1% to about 2.5%, or from about 1% to about 2%.

The linear thermal expansion coefficient of the composite core may be less than about $5 \times 10^{-6}$/° C., less than about $4 \times 10^{-6}$/° C., less than about $3 \times 10^{-6}$/° C., or less than about $2 \times 10^{-6}$/° C. (or in units of m/m/° C.). Stated another way, the linear thermal expansion coefficient may be, on a ppm basis per ° C., less than about 5, less than about 4, less than about 3, or less than about 2. For instance, the coefficient (ppm/° C.) may be in a range from about −0.4 to about 5; alternatively, from about −0.2 to about 4; alternatively, from about 0.4 to about 4; or alternatively, from about 0.2 to about 2. The temperature range contemplated for this linear thermal expansion coefficient may be generally in the −50° C. to 200° C. range, the 0° C. to 200° C. range, the 0° C. to 175° C. range, or the 25° C. to 150° C. range. The linear thermal expansion coefficient is measured in the longitudinal direction, i.e., along the length of the fibers.

The composite core also may exhibit a relatively small "bending radius", which is the minimum radius that the rod can be bent without damage and is measured to the inside curvature of the composite core or composite strand. A smaller bend radius means that the composite core may be more flexible and may be spooled onto a smaller diameter bobbin. This property also may permit easier substitution of the composite core in cables that currently use metal cores, and allow for the use of tools and installation methods presently in use in conventional overhead transmission cables. The bending radius for the composite core may, in some embodiments, be in a range from about 1 cm to about 60 cm, from about 1 cm to about 50 cm, from about 1 cm to about 50 cm, or from about 2 cm to about 45 cm, as determined at a temperature of about 25° C. The bending radius may be in a range from about 2 cm to about 40 cm, or from about 3 cm to about 40 cm in certain embodiments contemplated herein. In other embodiments, bending radiuses may be achieved that are less than about 40 times the outer diameter of the composite core, in some embodiments from about 1 to about 30 times the outer diameter of the composite core, and in some embodiments, from about 2 to about 25 times the outer diameter of the composite core, determined at a temperature of about 25° C.

Notably, the strength, physical, and thermal properties of the composite core referenced above also may be maintained over a relatively wide temperature range, such as from about −50° C. to about 300° C., from about 100° C. to about 300° C., from about 110° C. to about 250° C., from about 120° C. to about 200° C., from about 150° C. to about 200° C., or from about 180° C. to about 200° C.

The composite core also may have a low void fraction, such as about 6% or less, in some embodiments about 3% or less, in some embodiments about 2% or less, in some embodiments about 1% or less, and in some embodiments, about 0.5% or less. The void fraction may be determined in the manner described above, such as using a "resin burn off" test in accordance with ASTM D 2584-08 or through the use of computed tomography (CT) scan equipment, such as a Metrotom 1500 (2 k×2 k) high resolution detector.

In one embodiment, a composite core of the present invention may be characterized by the following properties: an ultimate tensile strength in a range from about 700 MPa to about 3,500 MPa; an elastic modulus from about 70 GPa to about 300 GPa; and a linear thermal expansion coefficient (in units of ppm per ° C.) in a range from about −0.4 to about 5. Additionally, the composite core may have a density of less than about 2.5 g/cc and/or a strength to weight ratio (in units of MPa/(g/cc)) in a range from about 500 to about 1,100. Further, in certain embodiments, the composite core may have a bending radius in a range from about 1 cm to about 50 cm. Still further, the composite core may have a percent elongation at break of less than about 3%.

In another embodiment, a composite core of the present invention may be characterized by the following properties: an ultimate tensile strength in a range from about 1,100 MPa to about 1,500 MPa; an elastic modulus in a range about 70 GPa to about 130 GPa; and a linear thermal expansion coefficient (in units of ppm per ° C.) in a range from about 0.2 to about 2. Additionally, the composite core may have a density in a range from about 1.2 g/cc to about 1.8 g/cc and/or a strength to weight ratio (in units of MPa/(g/cc)) in a range from about 700 to about 1,100. Further, in certain embodiments, the composite core may have a bending radius in a range from about 2 cm to about 40 cm. Still further, the composite core may have a percent elongation at break in a range from about 1% to about 2.5%.

As will be appreciated, the particular composite core embodiments described above are merely exemplary of the numerous designs that may be within the scope of the present invention. Among the various possible composite core designs, it should be understood that additional layers of material may be employed in addition to those described above. In certain embodiments, for example, it may be beneficial to form a multi-component core in which one component comprises a higher strength material and another component comprises from a lower strength material. Such multi-component cores may be particularly useful in increasing overall strength without requiring the need for more expensive high strength materials for the entire core. The lower and/or higher strength components may comprise ribbon(s) that contain continuous fibers embedded within a thermoplastic matrix.

Further, it should be understood that the scope of the present invention is by no means limited to the embodiments described above. For example, the composite cores may contain various other components depending on the desired application and its required properties. The additional components may be formed from a continuous fiber ribbon, such as described herein, as well as other types of materials. In one embodiment, for example, the composite core may contain a layer of discontinuous fibers (e.g., short fibers, long fibers, etc.) to improve its transverse strength. The discontinuous fibers may be oriented so that at least a portion of these fibers may be positioned at an angle relative to the direction in which the continuous fibers extend.

Electrical Cable

Consistent with embodiments disclosed herein, electrical cables of the present invention, such as high voltage overhead transmission lines, may comprise a cable core comprising at least one composite core, and a plurality of conductive elements surrounding the cable core. The cable core may be a single composite core, incorporating any composite core design and accompanying physical and thermal properties provided above. Alternatively, the cable core may comprise two or more composite cores, or composite strands, having either the same or different designs, and either the same or different physical and thermal properties. These two or more composite cores may be assembled parallel to each other (straight), or stranded, e.g., about a central composite core member.

Accordingly, in some embodiments, an electrical cable may comprise a cable core comprising one composite core surrounded by a plurality of conductive elements, while in other embodiments, an electrical cable may comprise a cable core comprising two or more composite cores, the cable core surrounded by a plurality of conductive elements. For example, the cable core may comprise, for instance, 2, 3, 4, 5, 6, 7, 8, 9, 10, 11, 12, 13, 14, 15, 16, 17, 18, 19, or 20 composite cores, or more (e.g., 37 composite cores), each of which may incorporate any composite core design and accompanying physical and thermal properties provided above. The composite cores may be arranged, bundled, or oriented in any suitable fashion, as would be recognized by one of skill in the art. For instance, the composite cores can be stranded, such as a cable core comprising 7 stranded composite cores or 19 stranded composite cores. Alternatively, the composite cores can be parallel, such as a cable core comprising a bundle of 7 composite cores aligned parallel to each other.

The electrical cable may comprise a plurality of conductive elements surrounding the cable core (e.g., a single composite core, a plurality of stranded composite cores). The conductive elements may be of any geometric shape, and may be round/circular wires or trapezoidal wires, among others, and including combinations thereof. The conductive elements may be in one layer, or 2 layers, or 3 layers, or 4 layers, and so forth, around the cable core. The conductive elements may be configured parallel to the cable core, or wrapped helically, or in any other suitable arrangement. Any number of conductive elements (e.g., wires) may be used, but a typical number of conductive elements in a cable may be up to 84 conductive elements, and often in a range from 2 to about 50. For instance, in some common conductor arrangements, 7, 19, 26, or 37 wires may be employed.

Exemplary transmission cable designs with composites cores which may be employed in various embodiments of the present invention are described in U.S. Pat. No. 7,211,319 to Heil, et al., which is incorporated herein in its entirety by reference thereto for all purposes.

Figure 9:
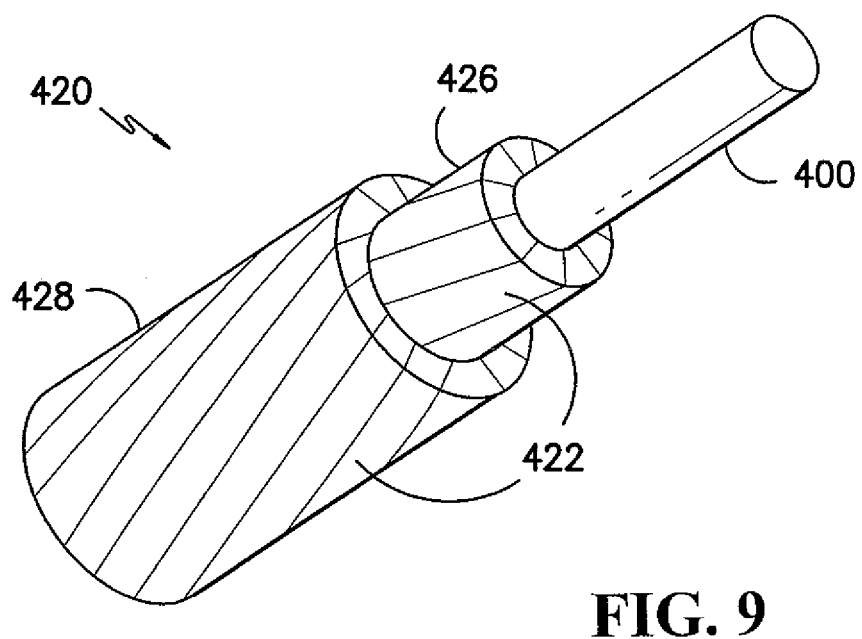
FIG. 9 is a perspective view of one embodiment of an electrical transmission cable of the present invention.

Referring now to FIG. 9, one embodiment of an electrical cable 420 is shown. As illustrated, the electrical cable 420 may include a plurality of conductive elements 422 (e.g., aluminum or an alloy thereof) radially disposed about a substantially cylindrical cable core 400, which is illustrated as a single composite core but could be a plurality of stranded composite cores. The conductive elements may be arranged in a single layer or in multiple layers. In the illustrated embodiment, the conductive elements 422 are arranged to form a first concentric layer 426 and a second concentric layer 428. The shape of the conductive elements 422 also may be varied around the cable core 400. In the illustrated embodiment, the conductive elements 422 have a generally trapezoidal cross-sectional shape. Other shapes also may be employed, such as circular, elliptical, rectangular, square, etc. The conductive elements 422 also may be twisted or wrapped around the cable core 400 in any desired geometrical configuration, such as in a helical manner.

Figure 10:
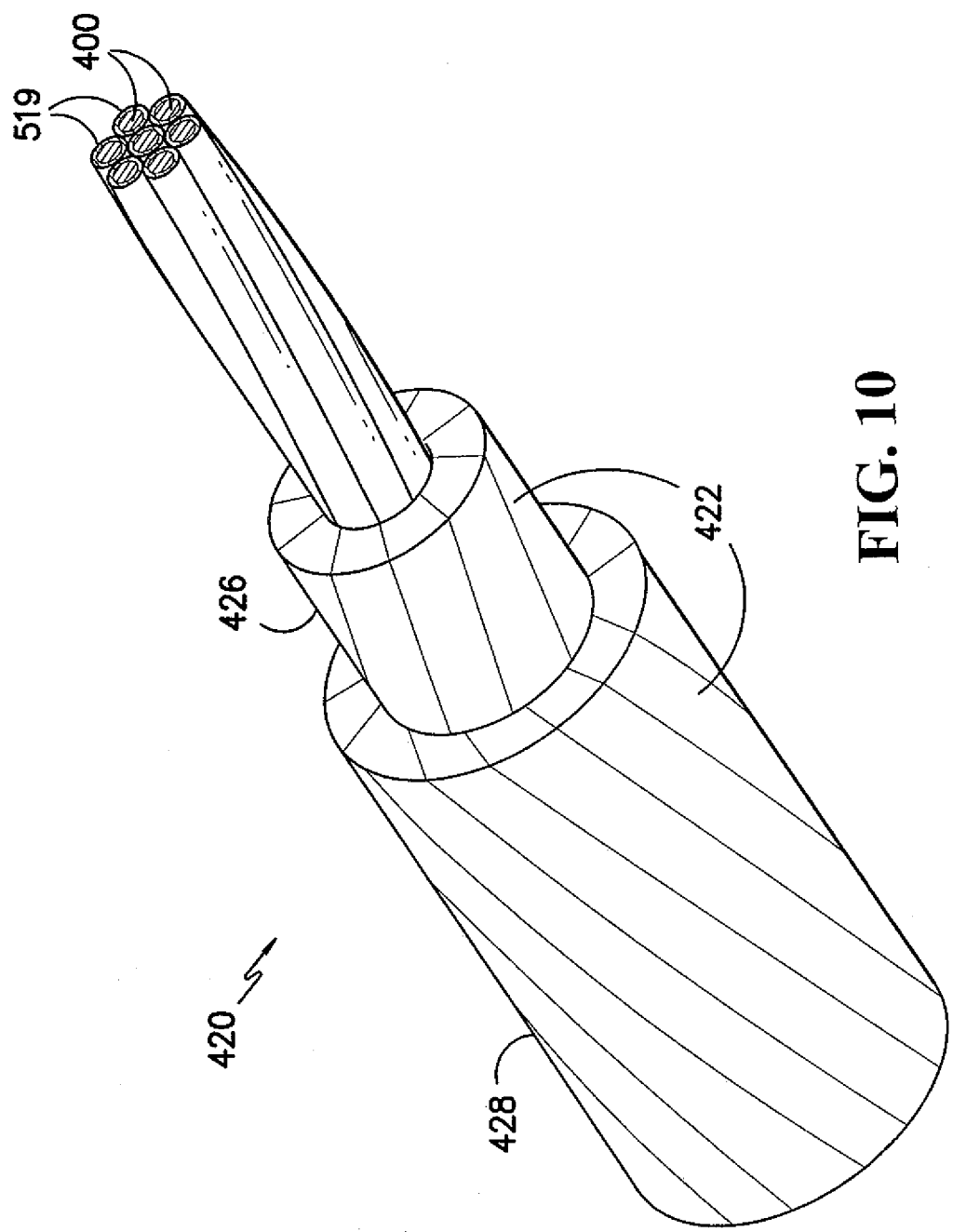
FIG. 10 is a perspective view of another embodiment of an electrical transmission cable of the present invention.

Referring to FIG. 10, for instance, another embodiment of an electrical transmission cable 420 is shown. As illustrated, the electrical transmission cable 420 may include a plurality of conductive elements 422 (e.g., aluminum or an alloy thereof) radially disposed about a bundle of generally cylindrical composite cores 400, which may be formed in accordance with the present invention. FIG. 10 illustrates six composite cores 400 surrounding a single core 400, although any suitable number of composite cores 400 in any suitable arrangement is within the scope and spirit of the present disclosure and may be used as the cable core. A capping layer 519 also may extend around the perimeter of and define an external surface of each rod. The conductive elements may be arranged in a single layer or in multiple layers. In the illustrated embodiment, for example, the conductive elements 422 are arranged to form a first concentric layer 426 and a second concentric layer 428. Of course, any number of concentric layers may be employed. The shape of the conductive elements 422 also may be varied to optimize the number of elements that can be disposed about the cable core. In the illustrated embodiment, for example, the conductive elements 422 have a generally trapezoidal cross sectional shape. Other shapes also may be employed, such as circular, elliptical, rectangular, square, etc. The conductive elements 422 also may be twisted or wrapped around the cable core containing the bundle of composite cores 400 in any desired geometrical configuration, such as in a helical manner.

The cross-sectional area of individual conductive elements may vary considerably, but generally the cross-sectional area of individual elements may be in a range from about 10 to about 50 mm$^2$, or from about 15 to about 45 mm$^2$. The overall conductor area may range (in kcmil), for instance, from about 167 to about 3500 kcmil, from about 210 to about 2700 kcmil, from about 750 to about 3500 kcmil, or from about 750 to about 3000 kcmil. Overall conductor areas of about 795, about 825, about 960, and about 1020 kcmil, often may be employed in many end-uses for electrical cables, such as in overheard power transmission lines. For instance, a common aluminum conductor steel reinforced cable known in the industry is often referred to as the 795 kcmil ACSR "Drake" conductor cable.

The outside diameter of cables in accordance with the present invention is not limited to any particular range. However, typical cable outside diameters may be within a range, for example, of from about 7 to about 50 mm, from about 10 to about 48 mm, from about 20 to about 40 mm, from about 25 to about 35 mm, or from about 28 to about 30 mm. Likewise, the cross-sectional area of a composite core in the cable is not limited to any particular range. However, typical cross-sectional areas of the composite core may be within a range from about 20 to about 140 mm$^2$, or from about 30 to about 120 mm$^2$.

The conductive elements may be made from any suitable conductive or metal material, including various alloys. The conductive elements may comprise copper, a copper alloy, aluminum, an aluminum alloy, or combinations thereof. As used herein, the term "aluminum or an aluminum alloy" is meant to collectively refer to grades of aluminum or aluminum alloys having at least 97% aluminum by weight, at least 98% aluminum by weight, or at least 99% aluminum by weight, including pure or substantially pure aluminum. Aluminum alloys or grades of aluminum having an IACS electrical conductivity of at least 57%, at least 58%, at least 59%, at least 60%, or at least 61% (e.g., 59% to 65%) may be employed in embodiments disclosed herein, and this is inclusive of any method that could produce such conductivities (e.g., annealing, tempering, etc.). For example, aluminum 1350 alloy may be employed as the aluminum or aluminum alloy in certain embodiments of this invention. Aluminum 1350, its composition, and its minimum IACS, are described in ASTM B233, the disclosure of which is incorporated herein by reference in its entirety.

In some applications, such as in overhead transmission lines, the sag of the electrical cable may be an important feature. Sag is generally considered to be the distance that a cable departs from a straight line between the end points of a span. The sag across a span of towers may affect the ground clearance, and subsequently, the tower height and/or the number of towers needed. Sag generally may increase with the square of the span length, but may be reduced by an increase in tensile strength of the cable and/or a decrease in weight of the cable. Electrical cables in some embodiments of the present invention may have a sag (at rated temperature (180° C.), and for a 300-meter level span) with a NESC light loading of from about 3 to about 9.5 m, from about 4.5 to about 9.5 m, from about 5.5 to about 8 m, or from about 6 to about 7.5 m. Likewise, with a NESC heavy loading, under similar conditions, the sag may be in a range from about 3 to about 9.5 m, from about 3 to about 7.5 m, from about 4.5 to about 7.5 m, or from about 5 to about 7 m.

In some embodiments, the cable also may be characterized as having a stress parameter of about 10 MPa or more, in some embodiments about 15 MPa or more, and in some embodiments, from about 20 to about 50 MPa. The method for determining the stress parameter is described in more detail in U.S. Pat. No. 7,093,416 to Johnson, et al., which is incorporated herein in its entirety by reference thereto for all purposes. For example, sag and temperature may be measured and plotted as a graph of sag versus temperature. A calculated curve may be fitted to the measured data using an Alcoa Sag10 graphic method available in a software program from Southwire Company (Carrollton, Ga.) under the trade designation SAG10 (version 3.0 update 3.10.10). The stress parameter is a fitting parameter in SAG10 labeled as the "built-in aluminum stress", which may be altered to fit other parameters, if a material other than aluminum is used (e.g., an aluminum alloy), and which adjusts the position of the knee-point on the predicted graph and also the amount of sag in the high temperature, post-knee-point regime. A description of the stress parameter also may be provided in the Sag10 Users Manual (Version 2.0), incorporated herein by reference in its entirety.

In relation to the subject matter disclosed herein, creep is generally considered to be the permanent elongation of a cable under load over a long period of time. The amount of creep of a length of cable may be impacted by the length of time in service, the load on the cable, the tension on the cable, the encountered temperature conditions, amongst other factors. It is contemplated that cables disclosed herein may have 10-year creep values at 15%, 20%, 25%, and/or 30% RBS (rated breaking stress) of less than about 0.25%, less than about 0.2%, or less than about 0.175%. For instance, the 10-year creep value at 15% RBS may be less than about 0.25%; alternatively, less than about 0.2%; alternatively, less than about 0.15%; alternatively, less than about 0.1%; or alternatively, less than about 0.075%. The 10-year creep value at 30% RBS may be less than about 0.25%; alternatively, less than about 0.225%; alternatively, less than about 0.2; or alternatively, less than about 0.175%. These creep values are determined in accordance with the 10-year ACSR conductor creep test (Aluminum Association Creep Test rev. 1999), incorporated herein by reference in its entirety.

Electrical cables in accordance with embodiments of this invention may have a maximum operating temperature up to about 300° C., up to about 275° C., or up to about 250° C. Certain cables provided herein may have maximum operating temperatures that may be up to about 225° C.; alternatively, up to 200° C.; alternatively, up to 180° C.; or alternatively, up to 175° C. Maximum operating temperatures may be in a range from about 100 to about 300° C., from about 100 to about 250° C., from about 110 to about 250° C., from about 120 to about 200° C., or from about 120 to about 180° C., in various embodiments of the present invention.

In accordance with some embodiments, it may be beneficial for the electrical cable to have certain fatigue and/or vibrational resistance properties. For instance, the electrical cable may pass (meet or exceed) the Aeolian vibration test specified in IEEE 1138, incorporated herein by reference, at 100 million cycles.

In some embodiments, the electrical cable may comprise a partial or complete layer of a material between the cable core and the conductive elements. For instance, the material may be conductive or non-conductive, and may be a tape that partially or completely wraps/covers the cable core. The material may be configured to hold or secure the individual composite core elements of a cable core together.

In some embodiments, the material may comprise a metal or aluminum foil tape, a polymer tape (e.g., a polypropylene tape, a polyester tape, a Teflon tape, etc.), a tape with glass-reinforcement, and the like. Often, the thickness of the material (e.g., the tape) may be in a range from about 0.025 mm to about 0.25 mm, although the thickness is not limited only to this range.

In one embodiment, the tape or other material may be applied so that each subsequent wrap overlaps the previous wrap. In another embodiment, the tape or other material may be applied so that each subsequent wrap leaves a gap between the previous wrap. In yet another embodiment, the tape or other material may be applied so that abuts the previous wrap with no overlap and no gap. In these and other embodiments, the tape or other material may be applied helically around the cable core.

In some embodiments, the electrical cable may comprise a partial or complete coating of a material between the cable core and the conductive elements. For instance, the material may be, or may comprise, a polymer. Suitable polymers may include, but are not limited to, a polyolefin (e.g., polyethylene and polypropylene homopolymers, copolymers, etc.), a polyester (e.g., polybutylene terephalate (PBT)), a polycarbonate, a polyamide (e.g., Nylon™), a polyether ketone (e.g., polyetherether ketone (PEEK)), a polyetherimide, a polyarylene ketone (e.g., polyphenylene diketone (PPDK)), a liquid crystal polymer, a polyarylene sulfide (e.g., polyphenylene sulfide (PPS), poly(biphenylene sulfide ketone), poly(phenylene sulfide diketone), poly(biphenylene sulfide), etc.), a fluoropolymer (e.g., polytetrafluoroethylene-perfluoromethylvinylether polymer, perfluoro-alkoxyalkane polymer, petrafluoroethylene polymer, ethylene-tetrafluoroethylene polymer, etc.), a polyacetal, a polyurethane, a styrenic polymer (e.g., acrylonitrile butadiene styrene (ABS)), an acrylic polymer, a polyvinyl chloride polymer (PVC), and the like, including combinations thereof. Moreover, the polymer may be an elastomeric polymer. The coating may be conductive or non-conductive, and may contain various additives typically employed in wire and cable applications. The coating may serve, in some embodiments, as a protective coating for the cable core. Additionally, the coating may be used in instances where the composite core does not contain a capping layer, and the coating partially or completely covers the rod (or fiber core), for example, as a protective coating for the rod.

In circumstances where the cable core comprises two or more composite cores (e.g., composite strands), the coating may partially or completely fill the spaces between the individual core elements.

The present invention also encompasses methods of making an electrical cable comprising a cable core and a plurality of conductive elements surrounding the cable core. Generally, electrical cables using various cable core configurations and conductor element configurations disclosed herein may be produced by any suitable method known to those of skill in the art. For instance, a rigid-frame strander, which can rotate spools of composite cores or strands to assemble a cable core, may be employed. In some embodiments, the rigid-frame strander may impart one twist per machine revolution into all composite cores or strands, except for the center composite core, which is not twisted. Each successive layer over the center composite core may be closed by a round die. After the final layer is applied, the cable core containing the composite cores or strands may be secured with a tape or other material. If tape is employed, it may be applied using a concentric taping machine. The resulting cable core with tape may be taken-up onto a reel. The cable core then may be fed back through the same rigid-frame strander for the application of a plurality of conductive elements around the cable core.

Consistent with embodiments of the present invention, methods of transmitting electricity are provided herein. One such method of transmitting electricity may comprise (i) installing an electrical cable as disclosed herein, e.g., comprising a cable core and a plurality of conductive elements surrounding the cable core, and (ii) transmitting electricity across the electrical cable. Another method of transmitting electricity may comprise (i) providing an electrical cable as disclosed herein, e.g., comprising a cable core and a plurality of conductive elements surrounding the cable core, and (ii) transmitting electricity across the electrical cable. In these and other embodiments, the electrical cable, cable core, and conductive elements may be any electrical cable, cable core, and conductive elements described herein. For instance, the cable core may comprise any composite core described herein, i.e., one or more composite cores or strands.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Example 1

Two (2) continuous fiber ribbons were initially formed using an extrusion system as substantially described above. Carbon fiber rovings (Toray T700SC, which contained 12,000 carbon filaments having a tensile strength of 4,900 MPa and a mass per unit length of 0.8 g/m) were employed for the continuous fibers with each individual ribbon containing 4 rovings. The thermoplastic polymer used to impregnate the fibers was polyphenylene sulfide (PPS) (FORTRON® PPS 205, available from Ticona, LLC), which has a melting point of about 280° C. Each ribbon contained 50 wt. % carbon fibers and 50 wt. % PPS. The ribbons had a thickness of about 0.18 mm and a void fraction of less than 1.0%. Once formed, the ribbons were then fed to a pultrusion line operating at a speed of 20 ft/min. Before shaping, the ribbons were heated within an infrared oven (power setting of 305). The heated ribbons were then supplied to a consolidation die having a circular-shaped channel that received the ribbons and compressed them together while forming the initial shape of the rod. Within the die, the ribbons remained at a temperature of about 177° C. Upon consolidation, the resulting preform was then briefly cooled with an air ring/tunnel device that supplied ambient air at a pressure of 1 psig. The preform was then passed through a nip formed between two rollers, and then to a calibration die for final shaping. Within the calibration die, the preform remained at a temperature of about 140° C. After exiting this die the profile was capped with a polyether ether ketone (PEEK), which had a melting point of 350° C. The capping layer had an average thickness of about 0.1-0.15 mm. The resulting part was then cooled with an air stream. The resulting composite core had an average outside diameter of about 3.4-3.6 mm, and contained 45 wt. % carbon fibers, 50 wt. % PPS, and 5 wt. % capping material.

To determine the strength properties of the composite core, three-point flexural testing was performed in accordance with ASTM D790-10, Procedure A. The support and nose radius was 0.25 inch, the support span was 30 mm, the specimen length was 2 in, and the test speed was 2 mm/min. The resulting flexural modulus was about 31 GPa and the flexural strength was about 410 MPa. The density of the part was 1.48 g/cm³ and the void content was less than about 3%. The bend radius was 3.27 cm.

Example 2

Two (2) continuous fiber ribbons were initially formed using an extrusion system as substantially described above. Carbon fiber rovings (Toray T700SC) were employed for the continuous fibers with each individual ribbon containing 4 rovings. The thermoplastic polymer used to impregnate the fibers was FORTRON® PPS 205. Each ribbon contained 50 wt. % carbon fibers and 50 wt. % PPS. The ribbons had a thickness of about 0.18 mm and a void fraction of less than 1.0%. Once formed, the ribbons were then fed to a pultrusion line operating at a speed of 20 ft/min. Before shaping, the ribbons were heated within an infrared oven (power setting of 305). The heated ribbons were then supplied to a consolidation die having a circular-shaped channel that received the ribbons and compressed them together while forming the initial shape of the rod. Within the die, the ribbons remained at a temperature of about 343° C. Upon consolidation, the resulting preform was then briefly cooled with an air ring/tunnel device that supplied ambient air at a pressure of 1 psig. The preform was then passed through a nip formed between two rollers, and then to a calibration die for final shaping. Within the calibration die, the preform remained at a temperature of about 140° C. After exiting this die the profile was capped with FORTRON® PPS 320, which had a melting point of 280° C. The capping layer had an average thickness of about 0.1-0.15 mm. The resulting part was then cooled with an air stream. The resulting composite core had an average outside diameter of about 3.4-3.6 mm, and contained 45 wt. % carbon fibers, 50 wt. % PPS, and 5 wt. % capping material.

To determine the strength properties of the composite core, three-point flexural testing was performed in accordance with ASTM D790-10, Procedure A. The support and nose radius was 0.25 inch, the support span was 30 mm, the specimen length was 2 in, and the test speed was 2 mm/min. The resulting flexural modulus was 20.3 GPa and the flexural strength was about 410 MPa. The density of the part was 1.48 g/cm³ and the void content was less than about 3%. The bend radius was 4.37 cm.

Example 3

Two (2) continuous fiber ribbons were initially formed using an extrusion system as substantially described above. Glass fiber rovings (TUFRov® 4588 from PPG, which contained E-glass filaments having a tensile strength of 2,599 MPa and a mass per unit length of 0.0044 lb/yd (2.2 g/m) were employed for the continuous fibers with each individual ribbon containing 2 rovings. The thermoplastic polymer used to impregnate the fibers was polyphenylene sulfide (PPS) (FORTRON® 205, available from Ticona, LLC), which has a melting point of about 280° C. Each ribbon contained 56 wt. % glass fibers and 44 wt. % PPS. The ribbons had a thickness of about 0.18 mm and a void fraction of less than 1.0%. Once formed, the ribbons were then fed to a pultrusion line operating at a speed of 20 ft/min. Before shaping, the ribbons were heated within an infrared oven (power setting of 330). The heated ribbons were then supplied to a consolidation die having a circular-shaped channel that received the ribbons and compressed them together while forming the initial shape of the rod. Upon consolidation, the resulting preform was then briefly cooled with ambient air. The preform was then passed through a nip formed between two rollers, and then to a calibration die for final shaping. Within the calibration die, the preform remained at a temperature of about 275° C. After exiting this die, the profile was capped with FORTRON® 205. The capping layer had an average thickness of about 0.1-0.15 mm. The resulting part was then cooled with an air stream. The resulting composite core had an average outside diameter of about 3.4-3.6 mm, and contained 50 wt. % glass fibers and 50 wt. % PPS.

To determine the strength properties of the composite core, three-point flexural testing was performed in accordance with ASTM D790-10, Procedure A. The support and nose radius was 0.25 inch, the support span was 30 mm, the specimen length was 2 in, and the test speed was 2 mm/min. The resulting flexural modulus was about 18 GPa and the flexural strength was about 590 MPa. The void content was about 0%, and the bend radius was 1.87 cm.

Example 4

Two (2) continuous fiber ribbons were initially formed using an extrusion system as substantially described above. Glass fiber rovings (TUFRov® 4588) were employed for the continuous fibers with each individual ribbon containing 2 rovings. The thermoplastic polymer used to impregnate the fibers was Nylon 66 (PA66), which has a melting point of about 250° C. Each ribbon contained 60 wt. % glass fibers and 40 wt. % Nylon 66. The ribbons had a thickness of about 0.18 mm and a void fraction of less than 1.0%. Once formed, the ribbons were then fed to a pultrusion line operating at a speed of 10 ft/min. Before shaping, the ribbons were heated within an infrared oven (power setting of 320). The heated ribbons were then supplied to a consolidation die having a circular-shaped channel that received the ribbons and compressed them together while forming the initial shape of the rod. Upon consolidation, the resulting preform was then briefly cooled with ambient air. The preform was then passed through a nip formed between two rollers, and then to a calibration die for final shaping. Within the calibration die, the preform remained at a temperature of about 170° C. After exiting this die, the profile was capped with Nylon 66. The capping layer had an average thickness of about 0.1-0.15 mm. The resulting part was then cooled with an air stream. The resulting composite core had an average outside diameter of about 3.4-3.6 mm, and contained 53 wt. % glass fibers, 40 wt. % Nylon 66, and 7 wt. % capping material.

To determine the strength properties of the composite core, three-point flexural testing was performed in accordance with ASTM D790-10, Procedure A. The support and nose radius was 0.25 inch, the support span was 30 mm, the specimen length was 2 in, and the test speed was 2 mm/min. The resulting flexural modulus was about 19 GPa and the flexural strength was about 549 MPa. The void content was about 0%, and the bend radius was 2.34 cm.

Example 5

Three (3) batches of eight (8) cores were formed having different void fraction levels. For each rod, two (2) continuous fiber ribbons were initially formed using an extrusion system as substantially described above. Carbon fiber rovings (Toray T700SC, which contained 12,000 carbon filaments having a tensile strength of 4,900 MPa and a mass per unit length of 0.8 g/m) were employed for the continuous fibers with each individual ribbon containing 4 rovings. The thermoplastic polymer used to impregnate the fibers was polyphenylene sulfide ("PPS") (FORTRON® PPS 205, available from Ticona, LLC), which had a melting point of about 280° C. Each ribbon contained 50 wt. % carbon fibers and 50 wt. % PPS. The ribbons had a thickness of about 0.18 mm and a void fraction of less than 1.0%. Once formed, the ribbons were then fed to a pultrusion line operating at a speed of 20 ft/min. Before shaping, the ribbons were heated within an infrared oven (power setting of 305). The heated ribbons were then supplied to a consolidation die having a circular-shaped channel that received the ribbons and compressed them together while forming the initial shape of the rod. Within the die, the ribbons remained at a temperature of about 177° C. Upon consolidation, the resulting preform was then briefly cooled with an air ring/tunnel device that supplied ambient air at a pressure of 1 psi. The preform was then passed through a nip formed between two rollers, and then to a calibration die for final shaping. Within the calibration die, the preform remained at a temperature of about 140° C. After exiting this die, the profile was capped with a polyether ether ketone ("PEEK"), which had a melting point of 350° C. The capping layer had a thickness of about 0.1 mm. The resulting composite core was then cooled with an air stream. The resulting composite core had a diameter of about 3.5 mm, and contained 45 wt. % carbon fibers, 50 wt. % PPS, and 5 wt. % capping material.

A first batch of composite cores had a mean void fraction of 2.78%. A second batch of composite cores had a mean void fraction of 4.06%. A third batch of composite cores had a mean void fraction of 8.74%. Void fraction measurements were performed using CT scanning. A Metrotom 1500 (2 k×2 k) high resolution detector was used to scan the core specimens. Detection was done using an enhanced analysis mode with a low probability threshold. Once the specimens were scanned for void fraction, Volume Graphics software was used to interpret the data from the 3D scans, and calculate the void levels in each specimen.

To determine the flexural fatigue life and residual flexural strength of the rods, three-point flexural fatigue testing was performed in accordance with ASTM D790. The support span was 2.2 in and the specimen length was 3 in. Four (4) composite cores from each batch were tested at a loading level of 160 Newtons ("N") and four (4) composite cores from each batch were tested at a loading level of 180 N, respectively, representing about 50% and 55% of the pristine (static) flexural strength of the cores. Each specimen was tested to one million cycles at a frequency of 10 Hertz (Hz).

Before and after fatigue testing, to determine the respective pristine and residual flexural strength properties of the rods, three-point flexural testing was performed in accordance with ASTM D790-10, Procedure A. The average pristine and residual flexural strengths of each batch at each loading level were recorded. The resulting pristine flexural strength for the third batch was 107 ksi, and the resulting residual flexural strength for the third batch was 75 ksi, thus resulting in a reduction of about 29%. The resulting pristine flexural strength for the second batch was 108 ksi, and the resulting residual flexural strength for the second batch was 72 ksi, thus resulting in a reduction of about 33%. The resulting pristine flexural strength for the first batch was 106 ksi, and the resulting residual flexural strength for the first batch was 105 ksi, thus resulting in a reduction of about 1%.

Example 6

Figure 15:
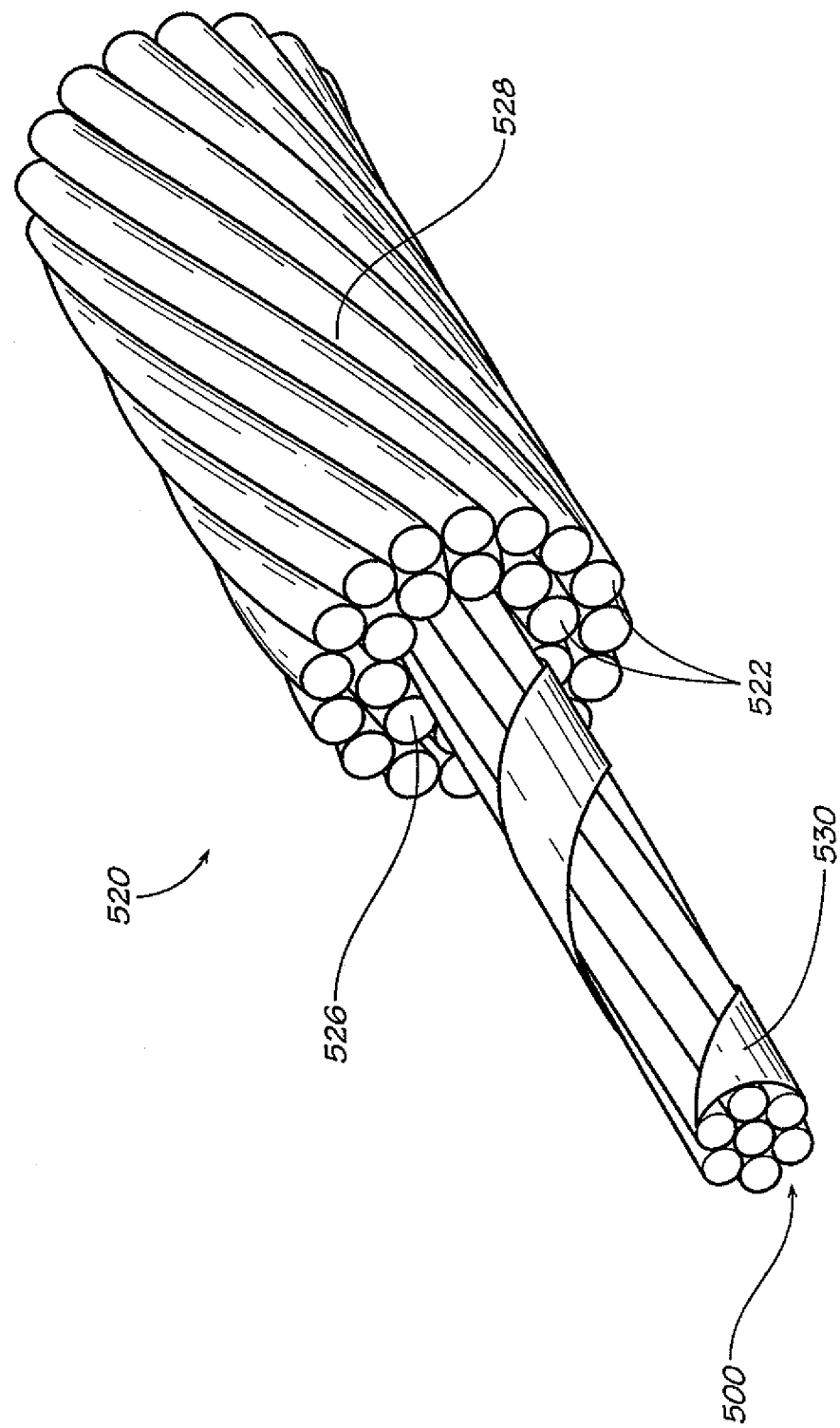
FIG. 15 is a perspective view of the electrical cable of Examples 6-7.

FIG. 15 illustrates the electrical cable 520 produced in Example 6. The 26 conductive elements 522 formed a first layer 526 and a second layer 528. The cable core 500 was a strand of 7 composite cores. A tape 530 between the cable core 500 and the conductive elements 522 partially covered the cable core 500 in a helical arrangement.

Electrical cable was produced as follows. Seven (7) composite cores having a diameter of about 3.5 mm were stranded to form a stranded cable core with a 508-mm lay length. The composite cores were similar to those produced in Example 1 above. The cable core was secured with an aluminum foil tape laminated to a fiberglass scrim and a silicone based adhesive. 26 conductor wires were placed above and around the cable core and tape in two layers as shown in FIG. 15. The conductor wires had a diameter of about 4.5 mm, and were fabricated from fully annealed 1350 aluminum. The ultimate tensile strength of the cable was approximately 19,760 psi (136 MPa).

Example 7

FIG. 15 illustrates the electrical cable 520 produced in Example 7. The 26 conductive elements 522 formed a first layer 526 and a second layer 528. The cable core 500 was a strand of 7 composite cores. A tape 530 between the cable core 500 and the conductive elements 522 partially covered the cable core 500 in a helical arrangement.

Figure 16:
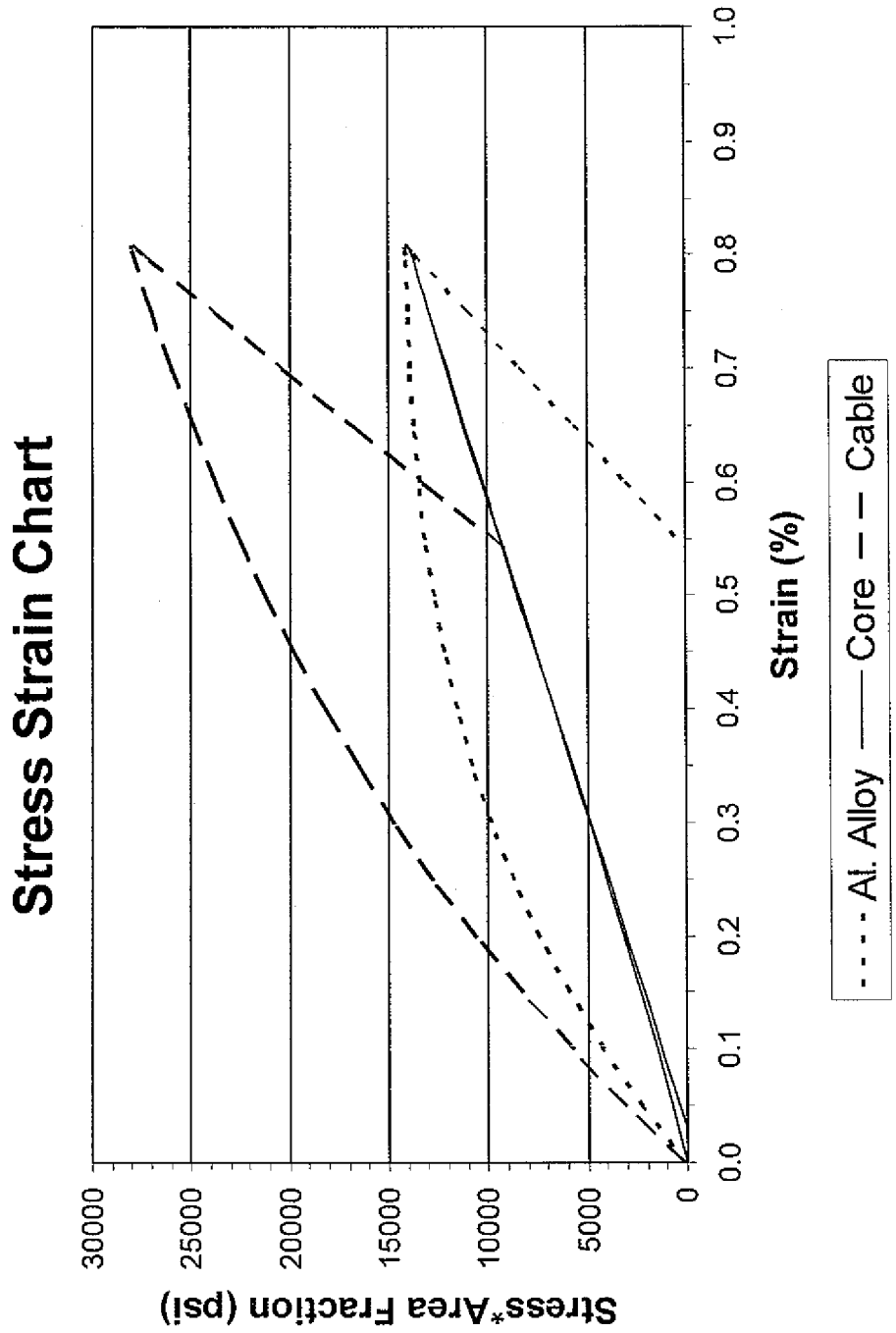
FIG. 16 is a stress-strain diagram for the electrical cable of Example 7.

Electrical cable was produced as follows. Seven (7) composite cores having a diameter of about 3.5 mm were stranded to form a stranded cable core with a 508-mm lay length. The composite cores were similar to those produced in Example 1 above. The cable core was secured with an aluminum foil tape laminated to a fiberglass scrim and a silicone based adhesive. 26 conductor wires were placed above and around the cable core and tape in two layers as shown in FIG. 15. The conductor wires had a diameter of about 4.5 mm, and were fabricated from an aluminum alloy containing zirconium (approximately 0.2-0.33% zirconium). FIG. 16 illustrates the stress-strain data for the electrical cable of Example 7.

The electrical cable of Example 7 was tested for its fatigue and/or vibrational resistance properties in accordance with the Aeolian vibration test specified in IEEE 1138. The electrical cable of Example 7 passed the Aeolian vibration test at 100 million cycles.

Using mathematical modeling based on overhead transmission cables similar to Example 7, the 10-year creep (elongation) values for the electrical cable of Example 7 were estimated. The calculated 10-year creep values at 15%, 20%, 25%, and 30% RBS (rated breaking stress) were approximately 0.054%, approximately 0.081%, approximately 0.119%, and approximately 0.163%, respectively.

Constructive Example 8

Figure 17:
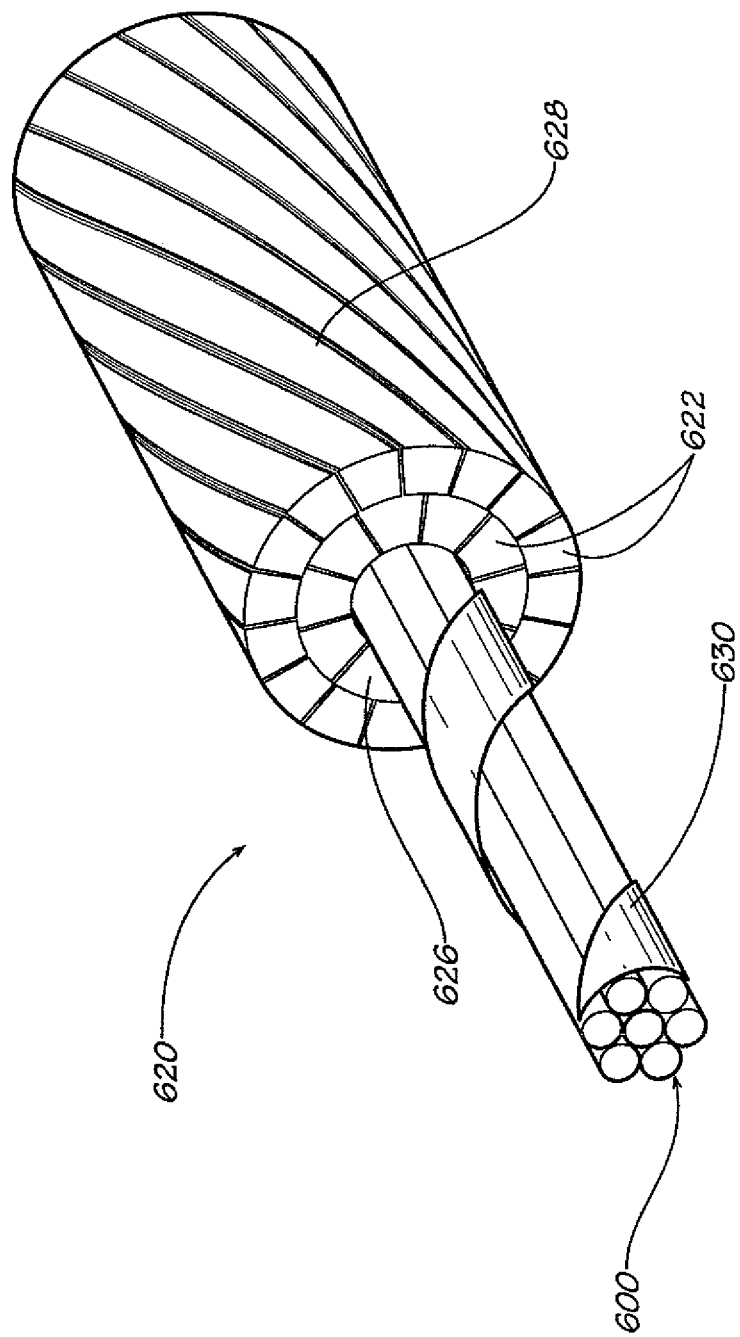
FIG. 17 is a perspective view of the electrical cable of Constructive Example 8.

FIG. 17 illustrates an electrical cable 620 that can be produced in Constructive Example 8. The 26 conductive elements 622 can form a first layer 626 and a second layer 628. The cable core 600 can be a strand of 7 composite cores. A tape 630 between the cable core 600 and the conductive elements 622 can partially cover the cable core 600 in a helical arrangement.

The electrical cable of FIG. 17 can be produced as follows. Seven (7) composite cores having a diameter of about 3.5 mm can be stranded to form a stranded cable core with a 508-mm lay length. The composite cores can be similar to those produced in Example 1 above. The cable core can be secured with an aluminum foil tape laminated to a fiberglass scrim and a silicone based adhesive. 26 conductor wires can be placed above and around the cable core and tape in two layers as shown in FIG. 17. The conductors can be trapezoidal wires having a cross-sectional area of about 15-17 mm$^2$, and can be fabricated from annealed 1350 aluminum (or alternatively, an aluminum alloy containing zirconium).

We claim:

1. An electrical cable comprising:
   (a) a cable core comprising at least one composite core, the composite core comprising:
      (i) at least one rod comprising a plurality of consolidated thermoplastic impregnated rovings, the rovings comprising continuous fibers oriented in the longitudinal direction and a thermoplastic matrix that embeds the fibers, the fibers having a ratio of ultimate tensile strength to mass per unit length of greater than about 1,000 MPa/g/m, wherein the rod comprises from about 25 wt. % to about 80 wt. % fibers and from about 20 wt. % to about 75 wt. % thermoplastic matrix; and
      (ii) a capping layer surrounding the at least one rod, wherein the capping layer is free of continuous fibers;
   wherein the composite core has a flexural modulus of at least about 10 GPa; and
   (b) a plurality of conductive elements surrounding the cable core.

2. The cable of claim 1, wherein:
   the fibers comprise carbon fibers; and
   the thermoplastic matrix comprises a polyphenylene sulfide.

3. The cable of claim 1, wherein:
   the fibers have a ratio of ultimate tensile strength to mass per unit length of from about 5,500 to about 20,000 MPa/g/m; and
   the capping layer comprises a thermoplastic polymer having a dielectric strength of at least about 2 kV/mm.

4. The cable of claim 1, wherein the composite core has:
   a flexural modulus of from about 15 to about 200 GPa; and
   an ultimate tensile strength of from about 500 MPa to about 3,500 MPa.

5. The cable of claim 1, wherein the composite core has:
   an elastic modulus in a range from about 70 GPa to about 300 GPa; or
   a density in a range from about 1.2 g/cc to about 1.8 g/cc; or
   a strength to weight ratio in a range from about 500 MPa/(g/cc) to about 1,100 MPa/(g/cc); or
   a percent elongation at break in a range from about 1% to about 2.5%; or
   a linear thermal expansion coefficient in the longitudinal direction in a range from about −0.4 to about 5 ppm per ° C.; or
   a bending radius in a range from about 1 cm to about 50 cm; or
   a void fraction of less than about 6%; or
   any combination thereof.

6. The cable of claim 1, wherein:
   the rod comprises from 2 to 20 rovings; and
   each roving comprises from about 1,000 to about 100,000 individual continuous fibers.

7. The cable of claim 1, wherein the cable core comprises two or more composite cores.

8. The cable of claim 7, wherein the cable core is a stranded core comprising from 2 to 37 composite cores, each composite core having a substantially circular cross-sectional shape.

9. The cable of claim 1, wherein the cable comprises up to 84 conductive elements, and wherein a total area of the conductive elements is in a range from about 167 to about 3500 kcmil.

10. The cable of claim 9, wherein:
    the conductive elements comprise copper, a copper alloy, aluminum, an aluminum alloy, or any combination thereof; or
    the conductive elements are arranged in 2, 3, or 4 layers around the cable core; or
    the conductive elements have a substantially circular cross-sectional shape or a substantially trapezoidal cross-sectional shape; or
    any combination thereof.

11. The cable of claim 10, wherein the conductive elements comprise aluminum or an aluminum alloy having an IACS electrical conductivity in a range from about 59% to about 65%.

12. The cable of claim 1, wherein the cable has:
    a sag, at rated temperature of 180° C., for a 300-meter level span with a NESC light loading, in a range from about 3 to about 9.5 m; and
    a sag, at rated temperature of 180° C., for a 300-meter level span with a NESC heavy loading, in a range from about 3 to about 7.5 m.

13. The cable of claim 1, wherein the cable has:
    a stress parameter in a range from about 20 MPa to about 50 MPa; or
    a 10-year creep value at 15% RBS (rated breaking stress) of less than about 0.2%; or
    a 10-year creep value at 30% RBS (rated breaking stress) of less than about 0.25%; or
    a maximum operating temperature in a range from about 100° C. to about 250° C.; or
    any combination thereof.

14. The cable of claim 1, wherein the cable passes an Aeolian vibration test at 100 million cycles.

15. The cable of claim 1, further comprising a partial or complete layer of tape between the cable core and the plurality of conductive elements.

16. An electrical cable comprising:
    (a) a cable core comprising at least one composite core, the composite core comprising:
       (i) at least one rod comprising a plurality of consolidated thermoplastic impregnated rovings, the rovings comprising continuous carbon fibers oriented in the longitudinal direction and a thermoplastic matrix that embeds the carbon fibers, the carbon fibers having a ratio of ultimate tensile strength to mass per unit length of greater than about 1,000 MPa/g/m, wherein the thermoplastic matrix comprises a polyarylene sulfide, and wherein the rod comprises from about 30 wt. % to about 75 wt. % carbon fibers and from about 25 wt. % to about 70 wt. % thermoplastic matrix; and
       (ii) a capping layer surrounding the at least one rod, wherein the capping layer comprises a polyether ether ketone and is free of continuous carbon fibers;
    wherein the composite core has a flexural modulus of at least about 10 GPa; and
    (b) a plurality of conductive elements surrounding the cable core, wherein the conductive elements comprise aluminum or an aluminum alloy.

17. The cable of claim 16, wherein the cable is a high voltage overhead transmission cable.

18. The cable of claim 16, wherein:
    the cable core comprises 7 composite cores or 19 composite cores; and
    the cable comprises up to 50 conductive elements arranged in 2, 3, or 4 layers around the cable core.

19. The cable of claim 16, wherein the composite core has:
    a flexural modulus of from about 15 to about 200 GPa; and an ultimate tensile strength of from about 500 MPa to about 3,500 MPa.

20. The cable of claim 16, wherein:
the polyarylene sulfide is a polyphenylene sulfide; and
the conductive elements have a substantially trapezoidal cross-sectional shape.

* * * * *